United States Patent
Bedi et al.

(10) Patent No.: US 11,869,125 B2
(45) Date of Patent: Jan. 9, 2024

(54) GENERATING COMPOSITE IMAGES WITH OBJECTS FROM DIFFERENT TIMES

(71) Applicant: Adobe Inc., San Jose, CA (US)

(72) Inventors: Ajay Bedi, Hamirpur (IN); Ajay Jain, Ghaziabad (IN); Jingwan Lu, Santa Clara, CA (US); Anugrah Prakash, Ghaziabad (IN); Prasenjit Mondal, Panchgechia (IN); Sachin Soni, Palam Colony (IN); Sanjeev Tagra, Panipat (IN)

(73) Assignee: Adobe Inc., San Jose, CA (US)

( * ) Notice: Subject to any disclaimer, the term of this patent is extended or adjusted under 35 U.S.C. 154(b) by 296 days.

(21) Appl. No.: 17/038,866

(22) Filed: Sep. 30, 2020

(65) Prior Publication Data

US 2022/0101578 A1   Mar. 31, 2022

(51) Int. Cl.
   *G06F 3/04842* (2022.01)
   *G06F 3/04845* (2022.01)
   (Continued)

(52) U.S. Cl.
   CPC .......... *G06T 11/60* (2013.01); *G06F 3/04842* (2013.01); *G06F 3/04845* (2013.01);
   (Continued)

(58) Field of Classification Search
   CPC . G06F 3/04842; G06F 3/04845; G06T 5/002; G06T 5/50; G06T 7/11;
   (Continued)

(56) References Cited

U.S. PATENT DOCUMENTS

| 6,731,799 B1 * | 5/2004 | Sun ..................... G06V 40/103 382/242 |
| 2002/0054694 A1 * | 5/2002 | Vachtsevanos ...... G06V 10/421 382/156 |

(Continued)

OTHER PUBLICATIONS

Sunkavalli et al. ("Video Snapshots: Creating High-Quality Images from Video Clips," IEEE Transactions on Visualization and Computer Graphics ( vol. 18, Issue: 11, Nov. 2012; Date of Publication: Mar. 6, 2012) (Year: 2012).*

(Continued)

*Primary Examiner* — Yubin Hung
(74) *Attorney, Agent, or Firm* — Keller Preece PLLC

(57) ABSTRACT

Methods, systems, and non-transitory computer readable media are disclosed for generating a composite image comprising objects in positions from two or more different digital images. In one or more embodiments, the disclosed system receives a sequence of images and identifies objects within the sequence of images. In one example, the disclosed system determines a target position for a first object based on detecting user selection of the first object in the target position from a first image. The disclosed system can generate a fixed object image comprising the first object in the target position. The disclosed system can generate preview images comprising the fixed object image with the second object sequencing through a plurality of positions as seen in the sequence of images. Based on a second user selection of a desired preview image, the disclosed system can generate the composite image.

20 Claims, 15 Drawing Sheets

(51) Int. Cl.
*G06T 5/00* (2006.01)
*G06T 5/50* (2006.01)
*G06T 7/11* (2017.01)
*G06T 7/60* (2017.01)
*G06T 11/60* (2006.01)

(52) U.S. Cl.
CPC ............... *G06T 5/002* (2013.01); *G06T 5/50* (2013.01); *G06T 7/11* (2017.01); *G06T 2200/24* (2013.01); *G06T 2207/10016* (2013.01); *G06T 2207/20084* (2013.01); *G06T 2207/20221* (2013.01)

(58) Field of Classification Search
CPC ............... G06T 11/60; G06T 2200/24; G06T 2207/10016; G06T 2207/20084; G06T 2207/20221
See application file for complete search history.

(56) References Cited

U.S. PATENT DOCUMENTS

| | | | | |
|---|---|---|---|---|
| 2005/0151743 A1* | 7/2005 | Sitrick | ............... | G09G 5/377 345/670 |
| 2007/0286482 A1* | 12/2007 | Au | ............... | G08B 13/1961 382/173 |
| 2012/0176481 A1* | 7/2012 | Lukk | ............... | H04N 13/111 348/47 |
| 2013/0124572 A1* | 5/2013 | Lettau | ............... | G06Q 10/0631 707/798 |
| 2013/0128121 A1* | 5/2013 | Agarwala | ............... | G11B 27/031 348/E5.077 |
| 2013/0230230 A1* | 9/2013 | Ajemba | ............... | G06T 5/008 382/133 |
| 2014/0079296 A1* | 3/2014 | Cleland | ............... | G06V 40/193 382/117 |
| 2014/0112534 A1* | 4/2014 | Sako | ............... | G06V 40/16 382/103 |
| 2014/0184858 A1* | 7/2014 | Yu | ............... | H04N 23/80 348/241 |
| 2014/0369627 A1* | 12/2014 | Huang | ............... | G06V 40/176 382/309 |
| 2017/0206662 A1* | 7/2017 | Wang | ............... | G06T 7/143 |
| 2019/0050427 A1* | 2/2019 | Wiesel | ............... | G06T 19/00 |
| 2020/0026928 A1* | 1/2020 | Rhodes | ............... | G06K 9/6262 |
| 2020/0202524 A1* | 6/2020 | Karki | ............... | G06T 5/008 |
| 2020/0294239 A1* | 9/2020 | Brada | ............... | G06T 7/10 |
| 2021/0019528 A1* | 1/2021 | Ghadyali | ............... | G06T 7/0004 |
| 2021/0027439 A1* | 1/2021 | Zobel | ............... | G06T 5/005 |
| 2021/0158043 A1* | 5/2021 | Hou | ............... | G06K 9/6218 |

OTHER PUBLICATIONS

Teodosio et al. ("Salient Video Stills: Content and Context Preserved," Proc. ACM Int'l Conf. Multimedia, vol. 1, No. 1, Feb. 2005) (Year: 2005).*
Kwatra et al. ("Graph-cut textures: Image and video synthesis using graph cuts," ACM Transactions on Graphics, Vo. 22, Issue 3; Jul. 2003) (Year: 2003).*
Kirillov et al. ("Panoptic Segmentation," arXiv:1801.00868v3, Apr. 10, 2019) (Year: 2019).*
Aseem Agarwala, et al., Interactive Digital Photomontage, ACM Transactions on Graphics (Proceedings of SIGGRAPH 2004), 2004.; http://grail.cs.washington.edu/projects/photomontage/photomontage.pdf (see attachment).

* cited by examiner

GENERATING COMPOSITE IMAGES WITH OBJECTS FROM DIFFERENT TIMES

BACKGROUND

Recent years have seen significant improvement in hardware and software platforms for capturing and editing digital images. Indeed, advances in both hardware and software have increased the ability of individuals to capture, create, and edit digital images. Additionally, the hardware on most modern computing devices (e.g., servers, desktops, laptops, tablets, and smartphones) enables digital image editing without significant lag time or processing delays. Improvements in software enable individuals to modify, combine, filter, or otherwise edit digital images. Examples of editing digital images include detecting objects, removing objects, copying an object from one image into a new background, etc.

Despite these advances, conventional systems still have several disadvantages that prevent efficient and accurate image editing in various instances. For example, in an attempt to capture multiple objects in motion in desired or relative positions, a user may capture the objects in motion via burst mode images or videos. Despite the use of burst mode images or videos, the user may not ever be able to capture the objects in the desired or relative positions. In such, cases the user may attempt to combine objects from multiple digital images into the same digital image using conventional image editing systems.

Unfortunately, conventional systems are inefficient. For example, conventional systems have significant shortfalls in relation to merging people and objects across images. For example, many conventional systems require a larger number of steps to remove an object from a digital image and replace it with an object from another digital image. Further, many of these steps are inefficient as the rely on user input and user actions and require high precision user input in order to arrive at a good quality result. The high precision required can make it difficult or impossible to perform such operations using hand-held devices (e.g., smart phones or tablets) due to the lack of screen space. As such, conventional systems often require merging people and objects to performed on traditional desktop computers with traditional input devices (e.g., a computer mouse). As many photographs are captured using handheld devices, conventional systems can require users to transfer images to other devices (e.g., a traditional desktop computer) in order edit images in arrive at an image with objects in motion in desired positions.

To better illustrate these inefficiencies, several conventional systems provide inefficient mouse input-based tools that further require users to manually perform numerous steps. In some cases, these tools can be imprecise and difficult to use. In other cases, the tools are complex and require a high level of skill and expertise to operate. In both cases, conventional systems require the user to perform numerous manual steps to add a missing person to a digital image, which increases the number of operations needed to be performed by a computing device. Indeed, significant time and user interactions with different selection tools by the user waste substantial computing resources in detecting, displaying, selecting, merging, blending, and correcting objects in digital images.

In addition to the foregoing, conventional systems typically require switching between different user interfaces to merge people from different images. In particular, conventional systems typically require opening a first image in a first graphical user interface to select an object in a desired position to move to a second image. Such systems then typically require opening a second user interface displaying the second image in order to add the selected object from the first image. More particularly, the process of merging objects from different images can often require switching between user interfaces multiples times as part of the operation.

Furthermore, even with a user is able to manually combine objects from multiple images to arrive at an image with the objects in the desired positions, such edited images include artifacts and other inaccuracies that cause the edited images to appear unnatural and edited. Indeed, even the best editors can struggle to ensure an edited image with objects from multiple images is devoid of artifacts and natural looking using conventional image editing tools. As mentioned above, such editing processes are time consuming and tedious and have to be performed on conventional computing devices rather than hand-held devices.

These, along with additional problems and issues exist in image editing systems.

BRIEF SUMMARY

One or more embodiments provide benefits and/or solve one or more problems in the art with systems, methods, and non-transitory computer readable storage media for accurately and efficiently merging objects in motion from different images to generate a composite digital image with the objects in desired positions or desired relative positions. In particular, the disclosed system receives an indication of an image from a series of images comprising a first object in a desired position. The disclosed system automatically generates and presents a series of preview images, where each preview image comprises the first object fixed in the first position selected by the user and the second object in one of the various different positions the second object moves through in the series of images. In response to a user selection of a position of the second object in a position from a second image shown in a preview image, the disclosed system generates a single composite image comprising objects in desired or target positions from different images. In this manner, the disclosed system automatically creates composite images with objects in desired positions from different images that appear natural and realistic.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings which are summarized below.

DETAILED DESCRIPTION

Figure 1:
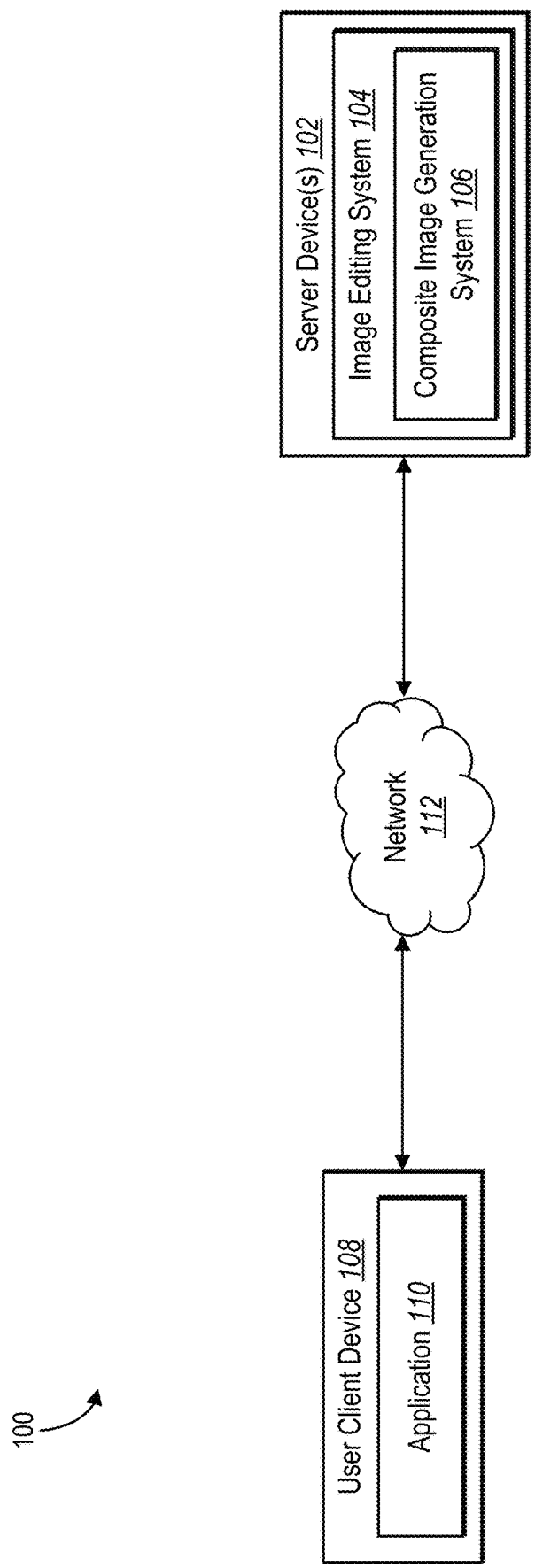
FIG. 1 illustrates an environment in which composite image generation system can operate in accordance with one or more embodiments of the present disclosure.

One or more embodiments of the disclosure include a composite image generation system that efficiently and accurately generates composite images comprising objects fixed in positions from different images. For example, the composite image generation system identifies and segments instances of objects in a series of images capturing objects in motion. The composite image generation system fixes a first object in a first position from a first image. The composite image generation system generates and presents a series of preview images comprising the first object fixed in the first position and the second object cycling through different positions from the sequence of images. In response to a user selection of a desired position of the second object, the composite image generation system generates a composite image depicting the first object in the first position from the first image and the second object in a second position from a second image. Thus, the composite image generation system generates a single composite image comprising objects in desired or target positions from different images.

To illustrate, the composite image generation system identifies instances of a first object and a second object in a sequence of images. The composite image generation system receives a selection of the first object in a first position from the first image via a graphical user interface. Based on the selection, the composite image generation system generates a fixed object image comprising the first object fixed in the first position. The composite image generation system provides the fixed object image for display via the graphical user interface with the second object sequencing through a plurality of positions from the sequence of images. Based on receiving a selection of the second object in a second position from a second image, the composite image generation system generates a composite image comprising the first object in the first position and the second object in the second position.

As mentioned, the composite image generation system identifies instances of objects in the sequence of images. In particular, the sequence of images depicts at least two objects in motion. In at least one embodiment, the composite image generation system utilizes a neural network to segment objects in each image within a sequence of images. In particular, the composite image generation system utilizes the appropriate neural network(s) to accurately identify and isolate objects within images.

The composite image generation system receives a user selection of an object in an image of the sequence of images. Generally, the composite image generation system determines, usually based on user input, a desired or target position for an object. In at least one embodiment, the composite image generation system provides an option to select an object in a target position. For example, the composite image generation system presents the sequence of images and receives a selection of a first object in a first position from an image. Additionally, or alternatively, in one or more embodiments, the composite image generation system detects user selection of an object that is in an incorrect position and sequences the selected object through a series of positions.

Upon determining a desired position of a first object, the composite image generation system generates a fixed object image. In particular, the fixed object image comprises the first object fixed in the desired position. In at least one embodiment, the composite image generation system generates the fixed object image by removing the segmented object mask (segmented objects) for other object(s) within the image. Additionally, the composite image generation system generates background pixels to fill pixels of the removed objects.

The composite image generation system presents the second object sequencing through a plurality of positions in connection with the fixed object image. For example, in at least one embodiment, the composite image generation system sequentially superimposes object masks for the second object in the plurality of positions on instances of the fixed object image. Thus, the composite image generation system offers previews of the second object in various positions from other images while fixing the first object in a single position.

The composite image generation system provides a graphical user interface for displaying the sequence of images as well as receiving user input. For instance, in some embodiments, the composite image generation system presents the sequence of images depicting objects in motion. Based on selection of an object in an image, the composite image generation system provides, via the graphical user interface, previews comprising the object in a fixed position together with additional objects in various positions. Thus, the composite image generation system presents an intuitive graphical user interface for identifying objects in desired positions and previewing potential composite images.

As mentioned, the composite image generation system generates a composite image depicting objects in positions from different images. While a sequence of images may comprise numerous images, it may fail to include a frame with all objects in target positions. The composite image generation system helps resolve this issue, for instance, by replacing an object in one position in an image with the same object in a different position from a different image in the sequence of images. Thus, the composite image generation system generates a composite image comprising a first object in a first position from a first image and a second object in a second position in a second image.

As previously mentioned, the composite image generation system provides numerous advantages, benefits, and practical applications over conventional systems. To illustrate, unlike conventional image editing systems, the composite image generation system provides the flexibility to automatically merge objects from multiple digital images into a composite image with minimal user interaction or effort. Further, in one or more embodiments, the composite image generation system operates utilizing a variety of models and algorithms. For example, in some embodiments, the composite image generation system performs a pipeline of actions where various actions are flexibly interchanged with different models or sub-systems. Indeed, the composite image generation system provides increased flexibility and expanded functionality over conventional systems.

As a further example, the composite image generation system provides increased accuracy over conventional systems. For instance, the composite image generation system creates natural and realistic composite photos that do not require user input to correct, touch up, or perform additional modifications. Furthermore, because the composite image generation system utilizes object detection and object mask neural networks, the composite image generation system can accurately identify instances of and generate accurate boundaries for objects within a sequence of images. In contrast, conventional systems often require users to manually manipulate portions of select images, which could take multiple hours to generate a comparable but less accurate/natural appearing composite image.

Moreover, the composite image generation system makes improvements to efficiency relative to conventional systems. In particular, the composite image generation system significantly reduces the number of actions required by many conventional systems to generate a composite image from a sequence of images. For instance, instead of relying on manual and inefficient mouse input-based tools to select, segment, paste, and blend an object, the composite image generation system intelligently performs each of these actions automatically. Indeed, the composite image generation system greatly simplifies the process and minimizes the required amount of user input.

In addition to the foregoing, the composite image generation system improves the efficiency of computing devices by reducing or eliminating the need to navigate between multiple user interfaces as required by conventional systems. In particular, the composite image generation system provides images for display within a single intuitive graphical user interface. Based on receiving a user selection indicating the desired position of a first object, the composite image generation system automatically displays a second object sequencing through a plurality of positions with the first object fixed in the desired position. Thus, rather than requiring users to navigate between user interfaces or window showing different images to view the objects in various positions, the composite image generation system presents previews of potential composite images within a single user interface.

The following disclosure provides additional detail regarding the composite image generation system in relation to illustrative figures portraying example embodiments and implementations of the composite image generation system. For example, FIG. 1 illustrates a schematic diagram of a system environment (or "environment") 100 in which a composite image generation system 106 operates in accordance with one or more embodiments. As illustrated, the environment 100 includes one or more server device(s) 102 connected to a user client device 108 via a network 112.

While FIG. 1 shows an embodiment of the composite image generation system 106, alternative embodiments and configurations are possible. For example, the environment 100 can include any number of client devices. As another example, the server device(s) 102 can represent a set of connected server devices. As a further example, the user client device 108 may communicate directly with the server device(s) 102, bypassing the network 112 or utilizing a separate and/or additional network.

As shown in FIG. 1, the server device(s) 102 and the user client device 108 are connected via the network 112. Each of the components of the environment 100 can communicate via the network 112. The network 112 comprises any suitable network over which computing devices can communicate. Example networks are discussed in additional detail below in relation to FIG. 13.

As illustrated in FIG. 1, the environment 100 includes the server device(s) 102. The server device(s) 102 may generate, store, receive, and transmit digital content including software hosted at the server device(s) 102, digital video, digital images, digital audio, digital designs, metadata, etc. In particular, the server device(s) 102 can provide various image editing functions to devices such as the user client device 108 via the network 112. For example, the server device(s) may receive and modify images received from the user client device 108. Additionally, or alternatively, the server device(s) 102 generate and modify images and provide the images to the user client device 108. In some embodiments, the server device(s) 102 comprise a distributed server where the server device(s) 102 include a number of server devices distributed across the network 112 and located in different physical locations. The server device(s) 102 can comprise a content server, an application server, a communication server, a web-hosting server, or a digital content management server.

As further shown in FIG. 1, the server device(s) 102 includes an image editing system 104. Generally, the image editing system 104 facilitates the creation, modification, sharing, and/or deletion of digital images within applications. For instance, the image editing system 104 provides a variety of tools related to image creation and editing (e.g., photo-editing). For example, the image editing system 104 provides selection tools, color correction tools, and image manipulation tools. Moreover, the image editing system 104 can operate in connection with one or more applications to generate or modify images. For example, in one or more embodiments, the image editing system 104 operates in connection with digital design applications such as ADOBE® PHOTOSHOP®, ADOBE® ELEMENTS®, ADOBE® INDESIGN®, or other image editing applications.

The image editing system 104 includes the composite image generation system 106. As described in additional detail below, the composite image generation system 106 accurately generates composite images comprising objects from different images in a sequence of images. In one or more embodiments, the composite image generation system 106 segments instances of objects in images of the sequence of images. In one or more embodiments, the composite image generation system 106 also determines a fixed position for a first object based on user interaction. In particular, based on user selection of a first object, the composite image generation system 106 generates a fixed object image comprising the first object in the first position. The composite image generation system 106 presents the fixed object image with a second object sequencing through a plurality of positions by superimposing the second object in the plurality of positions from the sequence of images. Upon detecting selection of the second object in a second position, the composite image generation system 106 generates a composite image comprising the first object in the first position and the second object in the second position.

As illustrated in FIG. 1, the environment 100 includes the user client device 108. The user client device 108 generates, stores, receives, and sends digital data. For example, the user client device 108 communicates with the server device(s) 102 via the network 112. The user client device 108 illustrated in FIG. 1 may comprise various types of client devices. For example, in some embodiments, the user client device 108 includes mobile devices such as laptops, tablets, mobile telephones, smartphones, etc. In other embodiments, the user client device 108 includes non-mobile devices, such as desktops or servers, or other types of client devices. In at least one embodiment, the user client device 108 comprises a touch-based device operated by touching icons and images on an LCD screen in lieu of, or in addition to, pressing physical buttons. Example of touch-based devices may include smartphones, tablets, laptops having touch pads, and other types of devices. Additional details with regard to the user client device 108 are discussed below with respect to FIG. 13.

In some embodiments, the user client device 108 is associated with a user of an image editing platform managed by the image editing system 104. As mentioned, the user client device 108 communicates with the server device(s) 102. In particular, the user client device 108 uploads and sends digital data including digital images and user input to the server device(s) 102 via the network 112. In one example, the user client device 108 displays graphical user interfaces including images and image editing tools to a user associated with the user client device 108.

As further illustrated in FIG. 1, the user client device 108 includes an application 110. In some embodiments, the application 110 comprises a web application or a native application on the user client device 108 (e.g., a mobile application, a desktop application, etc.). As illustrated, the application 110 interfaces with the composite image generation system 106 to provide digital data including graphical user interfaces, user interactions, digital images, and operations. For example, in one or more embodiments, the application 110 comprises a mobile application that renders a graphical user interface that includes digital images and tools for generating and/or modifying the digital images. Additionally, the application 110 also renders a graphical user interface for uploading digital images in a sequence of digital images. The application 110 sends and receives data from the composite image generation system 106 and presents, for display at the user client device 108, digital images, previews of composite images, and composite images.

Although FIG. 1 depicts the composite image generation system 106 located on the server device(s) 102, in some embodiments, the composite image generation system 106 is implemented by (e.g., located entirely or in part) on one or more other components of the environment 100. For example, the composite image generation system 106 may be implemented entirely (or in part) on the user client device 108.

Additionally, in some embodiments, the user client device 108 communicates directly with the composite image generation system 106, bypassing the network 112. Moreover, the composite image generation system 106 can access one or more databases (e.g., a vector design database) housed on the server device(s) 102 or elsewhere in the environment 100. Further, in some embodiments, the composite image generation system 106 includes one or more machine learning models (e.g., neural networks). In one or more embodiments, the composite image generation system 106 is implemented in a variety of different ways across the server device(s) 102, the network 112, and the user client device 108.

As mentioned above, the composite image generation system can employ machine learning and various neural networks in various embodiments. The machine learning refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., a natural language processing neural network, a specialized object detection neural network, a concept-based object detection neural network, a known object class detection neural network, an object proposal neural network, an unknown object class detection neural network, a region proposal neural network, a concept embedding neural network, an object mask neural network, an object classification neural network, and/or a selected object attribute detection neural network), data-based models (e.g., a natural language processing model, an unknown object class detection model, an object recognition model, a filtering model, and/or a selection object attribute model), or a combination of networks and models.

Neural network or artificial neural network refers to a machine learning model that can be tuned (e.g., trained) based on inputs to approximate unknown functions. In particular, a neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), Region-CNN (R-CNN), Faster R-CNN, Mask R-CNN, and single shot detect (SSD).

Figure 2:
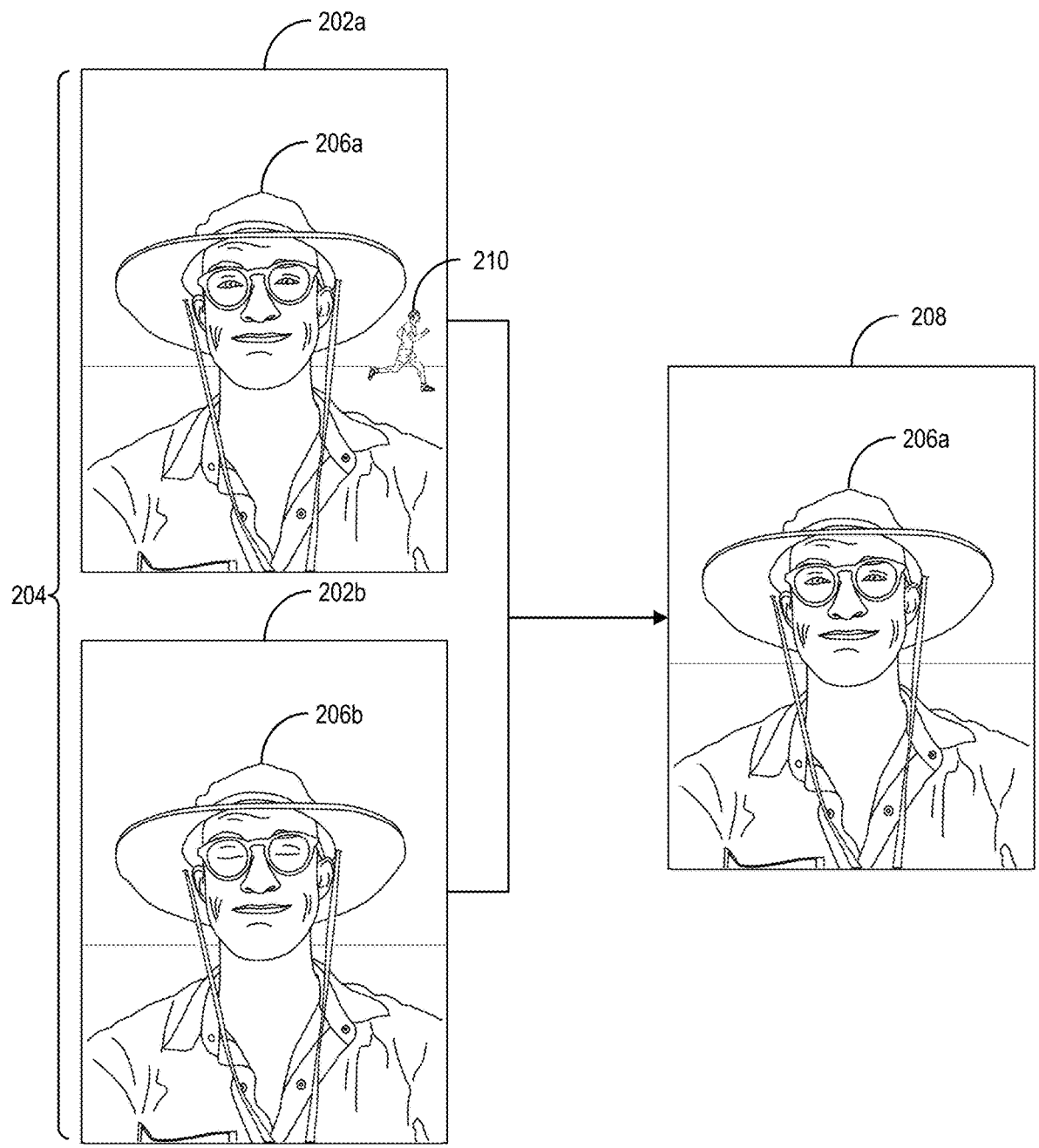
FIG. 2 illustrates an example sequence of images and an example composite image generated by the composite image generation system in accordance with one or more embodiments of the present disclosure.

FIG. 1 illustrates an example environment in which the composite image generation system 106 functions in accordance with one or more embodiments. FIG. 2 illustrates an example sequence of images received by the composite image generation system 106 and an example composite image generated by the composite image generation system 106 in accordance with one or more embodiments. In particular, FIG. 2 illustrates the composite image generation system 106 receiving a sequence of images 204 and generating a composite image 208.

FIG. 2 illustrates the sequence of images 204. Generally, a sequence of images comprises two or more digital images captured in succession. For example, the sequence of images 204 can comprise two or more images captured using burst mode photography. In another example, the sequence of images 204 comprises a series of frames extracted from a video file. Alternatively, the sequence of images is a series of images captured within a short period of time (e.g., 1 to 10 seconds) without using burst mode or capturing a video. While the sequence of images 204 illustrated in FIG. 2 comprises two digital images, sequences of images can comprise numerous (e.g., 5, 10, 50, 100, etc.) digital images. To illustrate, the sequence of images 204 may comprise 15 individual digital images extracted from a video at predetermined intervals. Thus, though the composite image generation system 106 generates the composite image 208 utilizing objects from digital images 202a-202b, the composite image generation system 106 still receives and analyzes any number of digital images within the sequence of images 204.

As further illustrated in FIG. 2, the sequence of images 204 includes the digital images 202a-202b. A digital image (or simply "image") comprises a digital graphics file that, when rendered, displays one or more objects. In one example, the digital image 202a comprises an image captured using burst photography or a frame of a video. Furthermore, and as illustrated, the digital images 202a-202b displays various objects.

The digital images 202a-202b illustrated in FIG. 2 depict instances of objects in various positions. Generally, objects comprise visual representations of a subject, concept, or sub-concepts in an image. For example, the digital image 202a includes an object 206a comprising a person in the foreground taking a selfie and an object 210 comprising a runner in the background. The digital image 202b includes the object 206b while the object 210 is presumably out of frame. In some embodiments, an object comprises a part of another object. For example, the composite image generation system 106 can designate a person's face, leg, or clothing as an object. Furthermore, in some embodiments, an object includes multiple instances of an object. For instance, an image of a rose bush includes multiple instances of roses. More specifically, an object refers to a set of pixels in an image that combine to form a visual depiction of an item, article, partial item, component, or element. An object can correspond to a wide range of classes and concepts. In one or more embodiments, an object includes sub-objects, parts, or portions. For example, a person's face or leg can be objects that are part of another object (e.g., the person's body). As another example, a shirt is an object that can be part of another object (e.g., a person).

As illustrated in FIG. 2, the digital images 202a-202b depict the objects in various positions. Generally, a position comprises a characteristic of an object at a certain point in time. For example, a position comprises a physical location of an object (or part of an object) within a digital image. For example, the object 210 is in a first position located in the background in the digital image 202a. In contrast, the object 210 is in a second position located in an area that is out-of-frame in the digital image 202b. Additionally, a position can more generally comprise other characteristic such as traits of an object. For example, the object 206a is in a first position in the digital image 202a and the corresponding object 206b is in a second position in the digital image 202b. As illustrated, in the first position, the object 206a comprises open eyes, and in the second position, the object 206b includes closed eyes.

As illustrated in FIG. 2, the composite image generation system 106 generates the composite image 208 based on the sequence of images 204. As illustrated, no digital image in the sequence of images 204 captures the desired positions of all objects (i.e., open eyes with no runner in the background). As explained in greater detail below, in response to user selections of the desired position of the objects (i.e., person with eyes open and the runner out of frame), the composite image generation system 106 generates a desired composite image. In particular, the composite image generation system 106 generates the composite image 208 including the object 206a in the first position (i.e., with open eyes) from the first digital image 202a and the object 210 in a second position (i.e., out of frame) from the second digital image 202b.

Figure 3A:
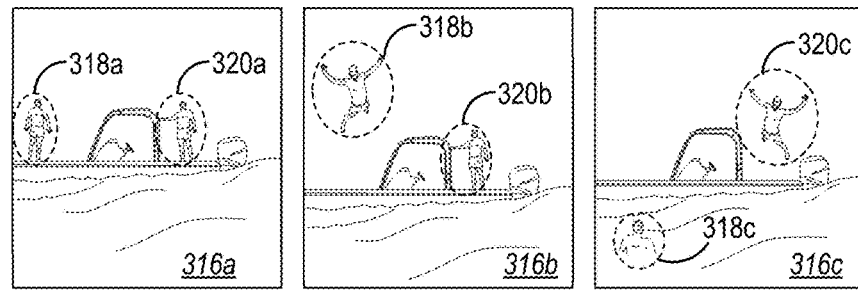
FIGS. 3A-3B illustrates an overview of steps that the composite image generation system performs to generate a composite image in accordance with one or more embodiments of the present disclosure.
Figure 3A:
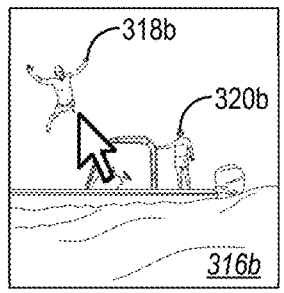
Figure 3A:
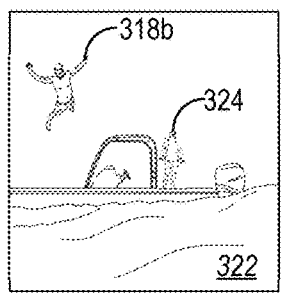
Figure 3B:
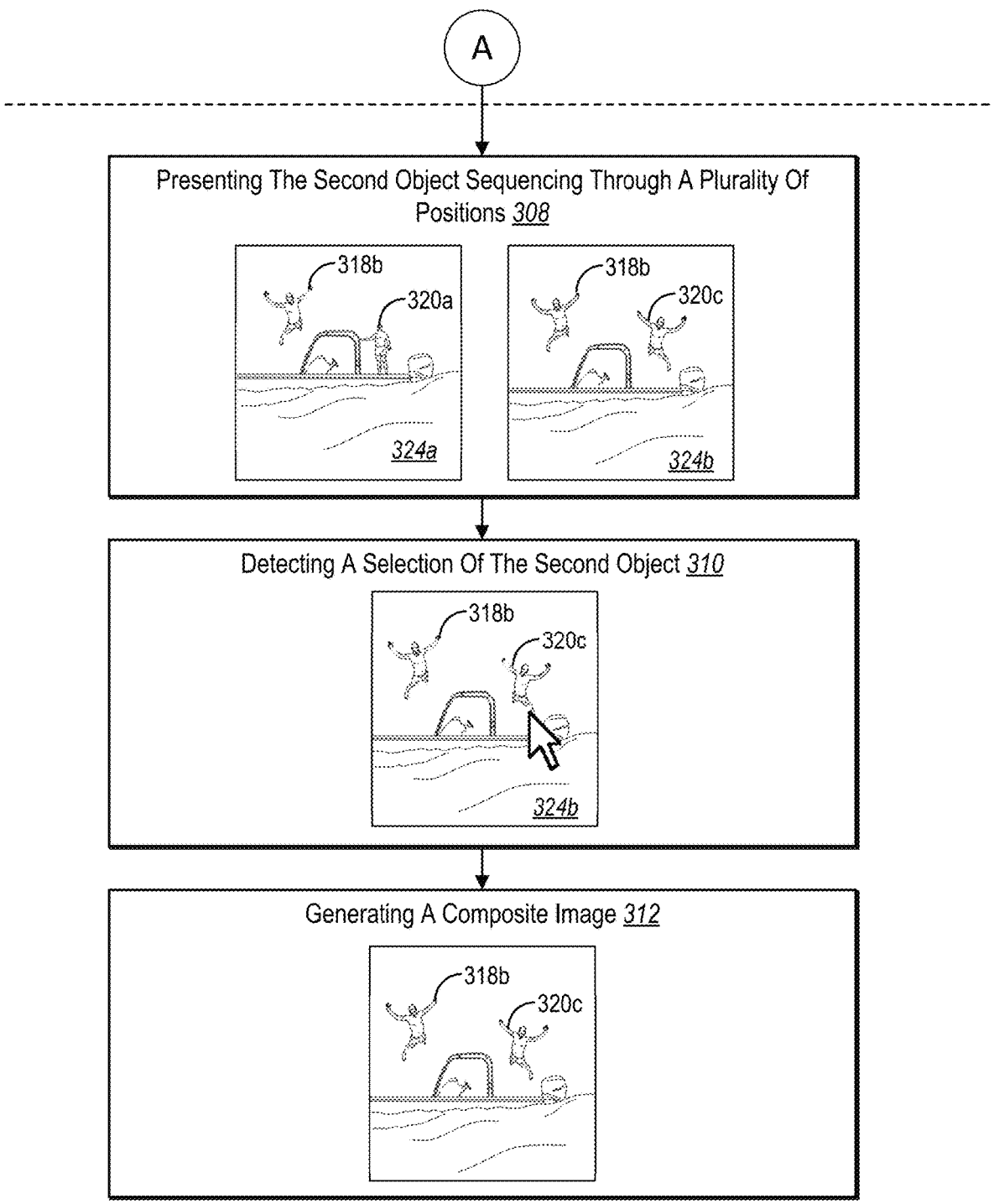

FIG. 2 illustrates an example input sequence of images and output composite image. FIGS. 3A-3B and the corresponding discussion provide a general overview of process the composite image generation system 106 performs to generate a composite image in accordance with one or more embodiments. In particular, FIGS. 3A-3B illustrate a series of acts 300 comprising an act 302 of segmenting instances of objects in a sequence of images, an act 304 of receiving a selection of a first object, an act 306 of generating a fixed object image, an act 308 of presenting the second object sequencing through a plurality of positions, an act 310 of detecting a selection of the second object, and an act 312 of generating a composite image.

As shown in FIG. 3A, the series of acts 300 includes the act 302 of segmenting instances of objects in a sequence of images. Generally, the composite image generation system 106 detects instances of objects across all images within the sequence of images. In particular, in one or more embodiments, the composite image generation system 106 utilizes a neural network to predict the identity and locations of objects within the images and then segments the objects (e.g., generates object masks for the objects). An object mask, object segmentation, or segmented object refers to an indication of a plurality of pixels portraying an object. For example, an object mask can include a segmentation boundary (e.g., a boundary line or curve indicating an edge of one or more objects) or a segmentation mask (e.g., a binary mask identifying pixels corresponding to an object).

Figure 4:
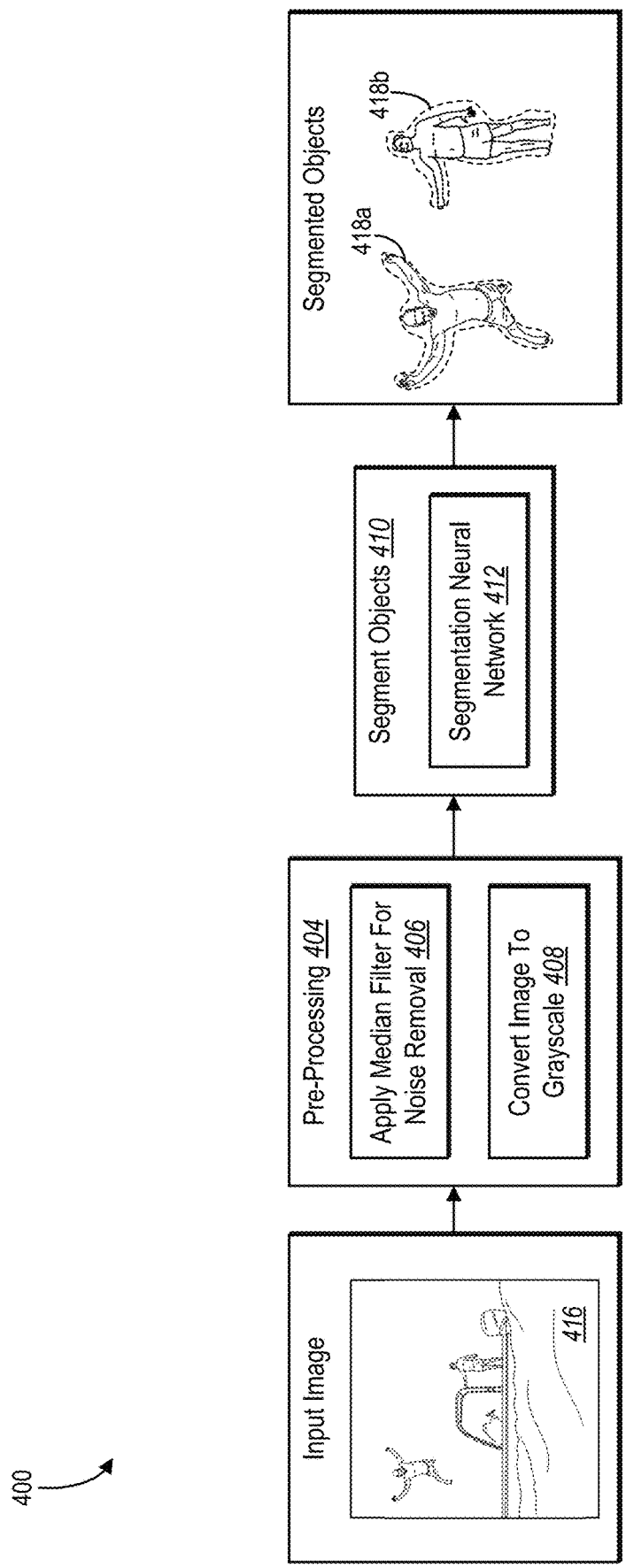
FIG. 4 illustrates an overview of steps that the composite image generation system performs when segmenting objects within a sequence of images in accordance with one or more embodiments of the present disclosure.

As illustrated, the composite image generation system 106 analyzes each of the digital images 316a-316c within a sequence of images. The composite image generation system 106 identifies a first object and a second object in each of the digital images 316a-316c. More particularly, the composite image generation system 106 identifies a first object in a first position 318a in the digital image 316a, the first object in a second position 318b in the digital image 316b, and the first object in a third position 318c in the digital image 316c. Similarly, the composite image generation system 106 identifies instances of a second object in a first position 320a, the second object in a second position 320b, and the second object in a third position 320c in the digital images 316a, 316b, and 316c, respectively. Still further the composite image generation system 106 segments the identified objects (e.g., determines a plurality of pixels portraying an object). More specifically, in one or more embodiments, the composite image generation system 106 utilizes a segmentation neural network, such as a semantic segmentor, to assign a label to pixels in an image and group pixels with similar label to identify the objects. FIG. 4 and the corresponding discussion provide additional detail with respect to the composite image generation system 106 segmenting instances of objects in a sequence of images utilizing a segmentation neural network in accordance with one or more embodiments.

Figure 5:
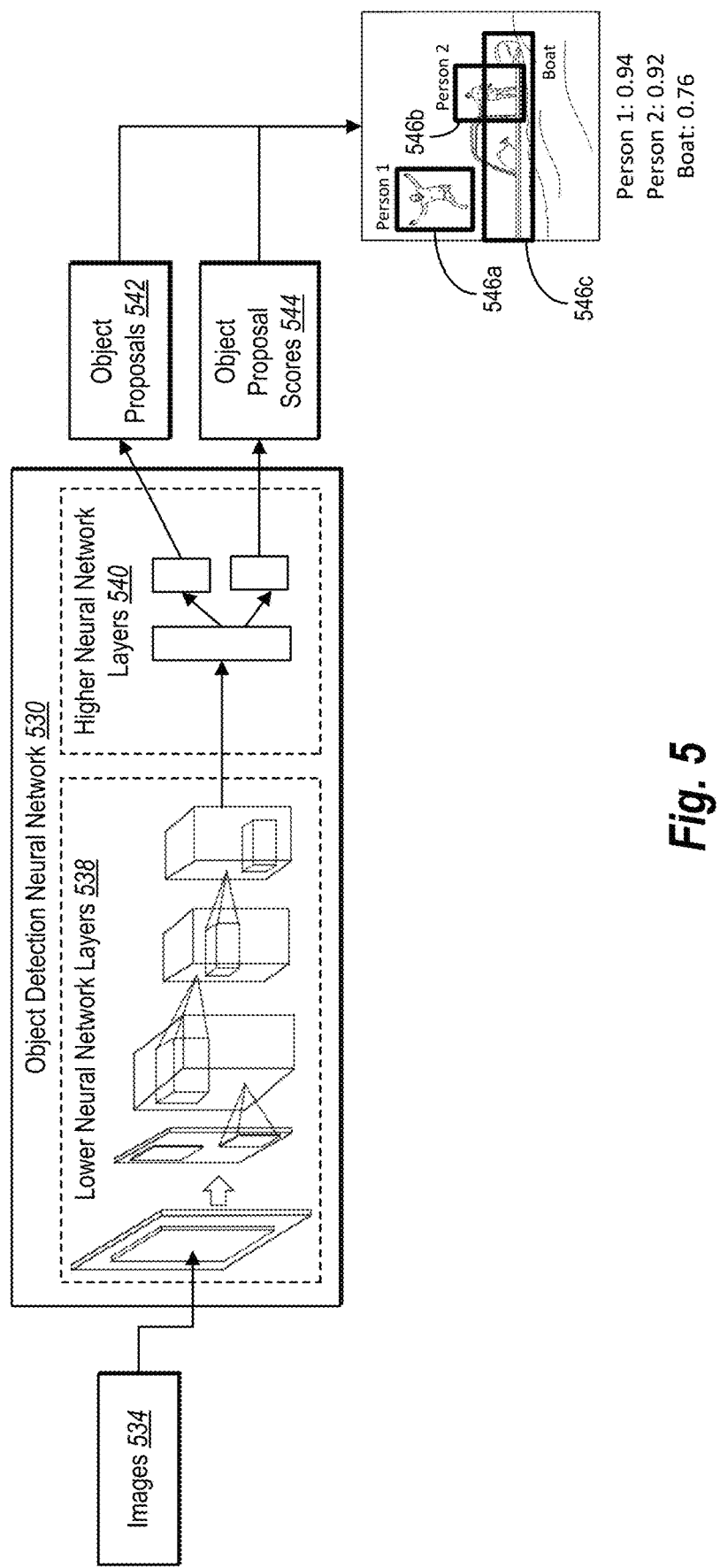
FIG. 5 illustrates an example object detection neural network in accordance with one or more embodiments of the present disclosure.
Figure 6:
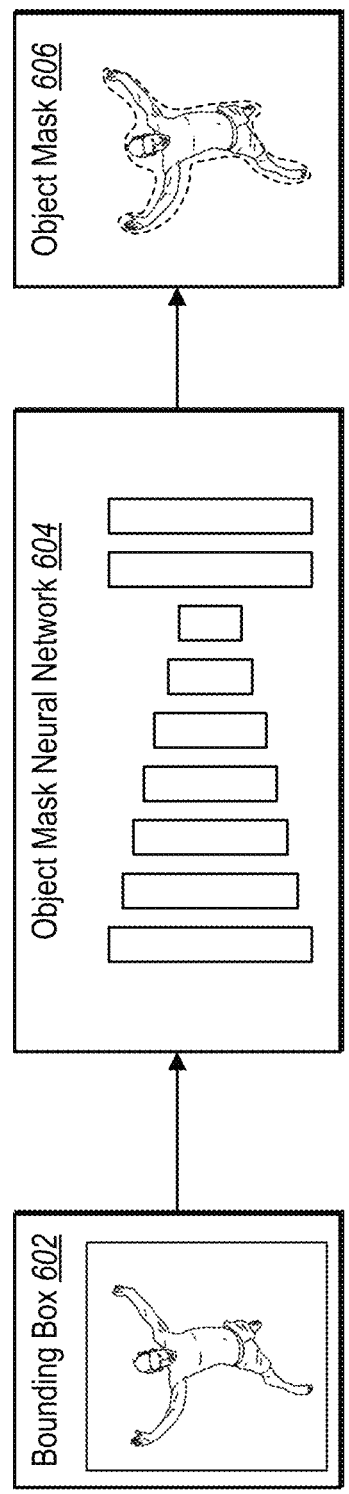
FIG. 6 illustrates an example object mask neural network in accordance with one or more embodiments of the present disclosure.

In some embodiments, to segment the objects, the composite image generation system utilizes an object detection neural network and an object mask neural network. For example, the composite image generation system 106 identifies instances of objects in the series of images utilizing an object detection neural network. For example, in at least one embodiment, the composite image generation system 106 generates bounding boxes about instances of objects in the sequence of images. In one example, the composite image generation system 106 further utilizes an object mask neural network to generate object masks that mark specific pixels in each bounding box, and subsequently in the corresponding image, that belong to each identified object. FIGS. 5 and 6 and the corresponding discussion provide additional detail with respect to the composite image generation system 106 utilizing an object detection neural network and an object mask neural network to segment objects in the images.

Figure 10A:
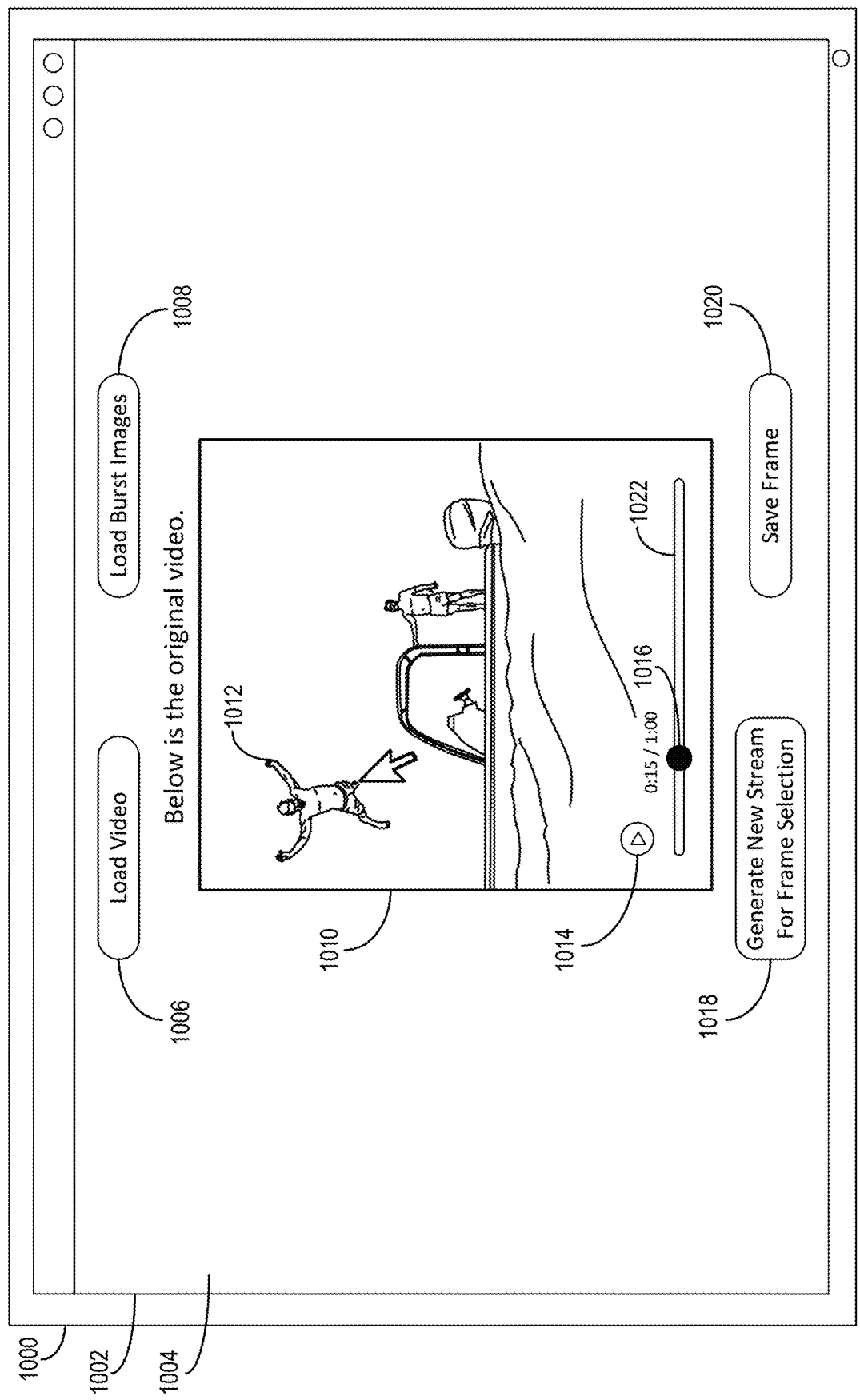
FIGS. 10A-10B illustrate a series of graphical user interfaces for receiving user input and displaying composite images in accordance with one or more embodiments of the present disclosure.

As further illustrated in FIG. 3A, the composite image generation system 106 performs the act 304 of receiving a selection of a first object. In some embodiments, the composite image generation system 106 provides, for display via a graphical user interface, images in the sequence of images. The composite image generation system 106 receives a user selection that indicates a target or desired position for an object as displayed in an image of the sequence of images. For example, the composite image generation system 106 receives a selection of the first object in the second position 318b from the digital image 316b and designates the position of the selected first object in the second position 318b as the target position. FIG. 10A illustrates an example graphical user interface by which the composite image generation system 106 receives a selection of a first object in a target position in accordance with one or more embodiments.

While in some embodiments, the composite image generation system 106 determines the target position of a first object based on a selection of the first object, the composite image generation system 106 can also determine the target position of the first object based on a selection of the second object. For example, in some embodiments, the composite image generation system 106 prompts a user to select an object that the user would like to manipulate (i.e., is in an incorrect position). Thus, based on selection of the second object, the composite image generation system 106 determines that the first object is in the target position.

Figure 8:
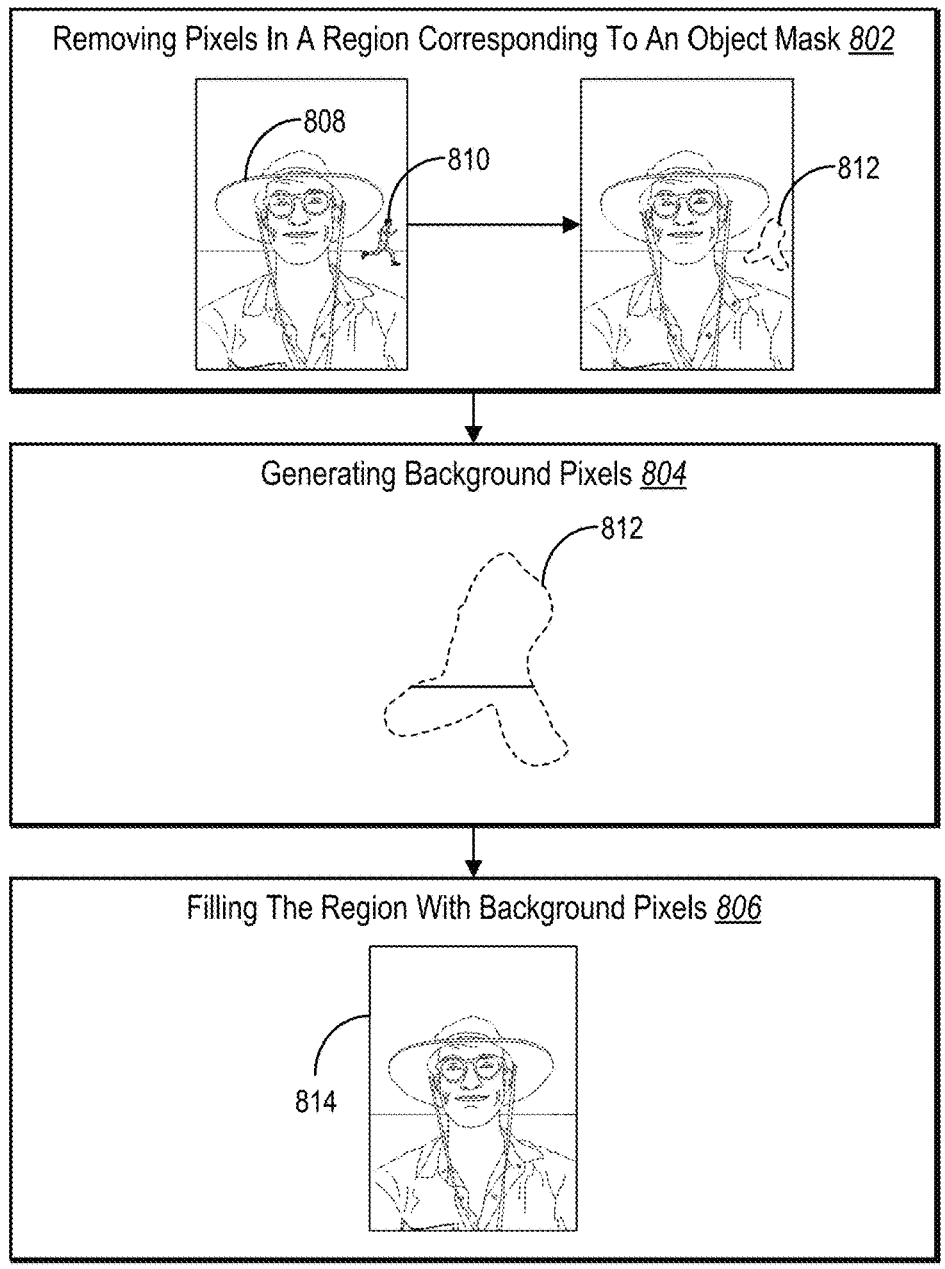
FIG. 8 illustrates an overview of steps that the composite image generation system performs when creating a fixed object image in accordance with one or more embodiments of the present disclosure.

The composite image generation system 106 also performs the act 306 of generating a fixed object image. Generally, the fixed object image comprises an image in which a first object is fixed in a target position. As part of performing the act 306, the composite image generation system 106 selects the image in which the first object 318b is in the target or desired position (i.e., the digital image 316b). The composite image generation system 106 modifies the digital image 316b by removing the second object and generating background pixels 324 to fill in pixels of the removed second object to generate a fixed object image 322. FIG. 8 and the corresponding discussion provide additional detail regarding how the composite image generation system 106 generates a fixed object image in accordance with one or more embodiments.

Figure 9:
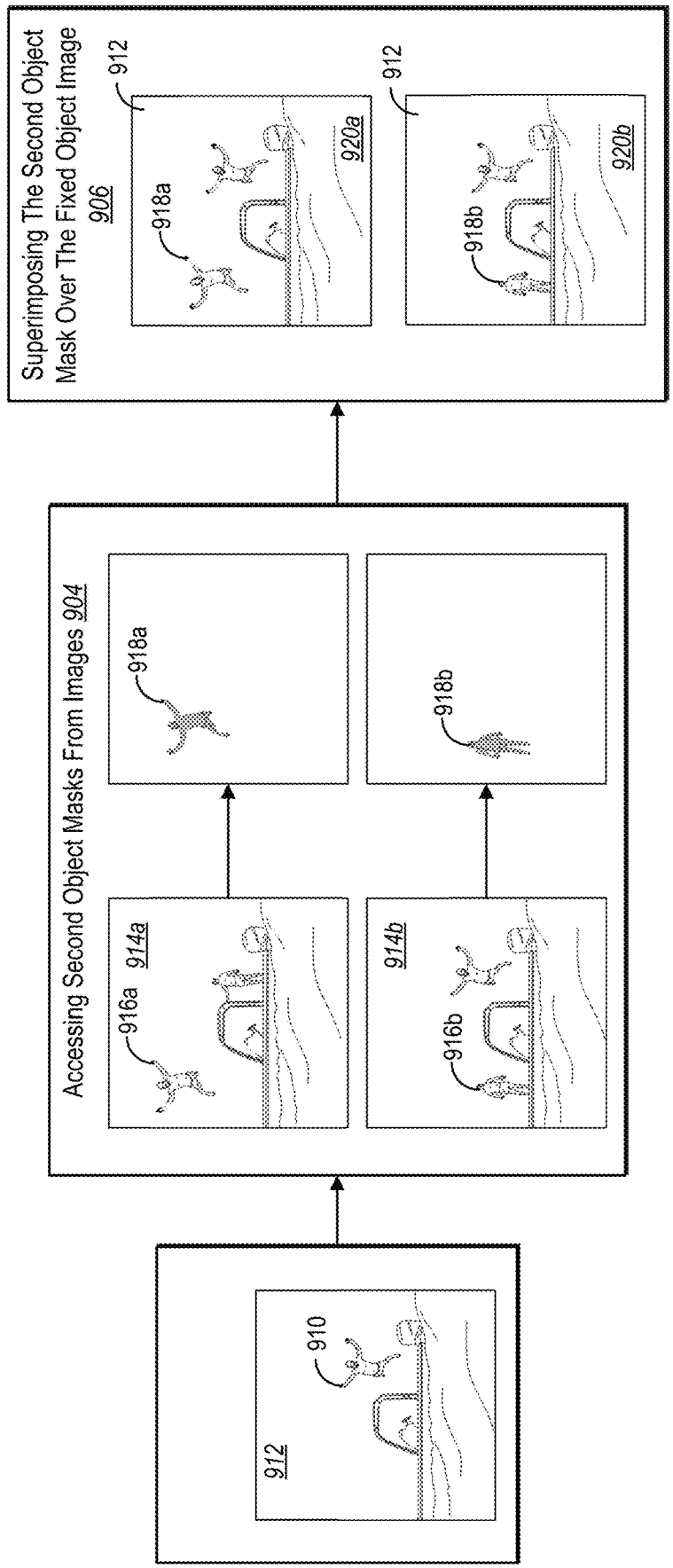
FIG. 9 illustrates an overview of steps that the composite image generation system performs when generating preview images comprising a second object sequencing through a plurality of positions in accordance with one or more embodiments of the present disclosure.

As illustrated in FIG. 3B, the composite image generation system 106 performs the act 308 of presenting the second object in the fixed object image 322 sequencing through a plurality of positions. Generally, the composite image generation system 106 sequentially superimposes the second object in the plurality of positions from the sequence of images on the fixed object image 322. By superimposing the second object in the plurality of positions, the composite image generation system 106 generates preview images 324a-324b for potential composite images. Generally, preview images (or simply "previews") indicate potential composite images. For example, and as illustrated, the composite image generation system 106 superimposes the second object in the first position 320a from the digital image 316a to create the preview image 324a and the second object in the third position 320c from the digital image 316c to create the preview image 324b. FIG. 9 and the corresponding discussion provide additional detail regarding how the composite image generation system 106 performs the act 308 in accordance with one or more embodiments.

Figure 10B:
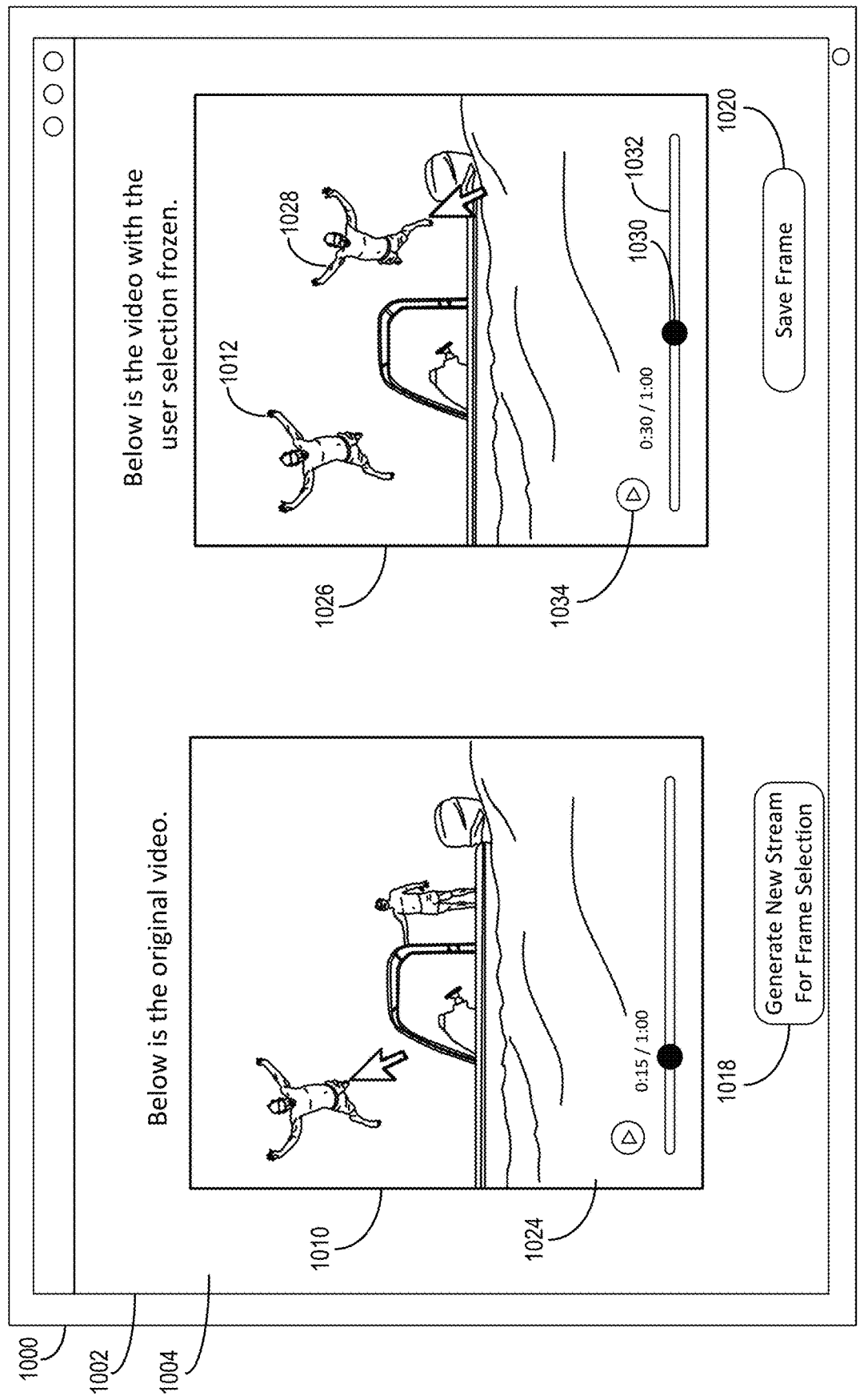

The composite image generation system 106 also performs the act 310 of detecting a selection of the second object. Generally, the composite image generation system 106 receives an indication of a target position for the second object. For example, and as illustrated in FIG. 3B, the composite image generation system 106 receives a user selection of the second object in the third position 320c from the digital image 316c. Although FIG. 3B illustrates the composite image generation system 106 receiving a selection of the second object 320c, the composite image generation system 106 may also receive a selection of a preview image (e.g., the preview image 324b) as a whole. FIG. 10B illustrates an example graphical user interface by which the composite image generation system 106 receives a selection of a second object in a target position in accordance with one or more embodiments.

As illustrated in FIG. 3B, the series of acts 300 includes the act 312 of generating a composite image. The composite image comprises objects in their target positions. For example, the composite image generation system 106 generates a composite image comprising the first object in the second position 318b from the digital image 316b and the second object in the third position 320c from the digital image 316c.

In some embodiments, the composite image generation system 106 performs acts in addition to the series of acts 300 to generate a composite image with multiple additional objects. For instance, the composite image generation system 106 may identify an instance of a third (or additional) object(s) in the sequence of images. Furthermore, based on performing the act 310 of detecting a selection of the second object, the composite image generation system 106 generates a second fixed object image comprising the first object and the second object in fixed positions. The composite image generation system 106 further generates a second set of previews with the third object sequencing through two or more positions. Based on receiving a selection of the third object or a preview image, the composite image generation system 106 generates a second composite image. The composite image generation system 106 performs these additional acts upon completion of the series of acts 300, as part of the series of acts 300, or a combination. For example, in one embodiment, the composite image generation system 106 identifies the instance of the additional object as part of the act 302.

As mentioned, FIGS. 3A-3B provide a broad overview of acts performed by the composite image generation system 106 to generate a composite image. As mentioned previously, FIG. 4 provides additional detail with respect to how the composite image generation system 106 identifies instances of objects in images of the sequence of images. In particular, FIG. 4 illustrates the composite image generation system 106 segmenting objects in images. FIG. 4 illustrates a series of acts 400 comprising an act 404 of performing pre-processing on a digital image 146, and an act 410 of segmenting objects to generate object masks.

As illustrated in FIG. 4, the series of acts 400 includes the composite image generation system 106 performs the act 404 of pre-processing the images in the series of digital images. In some embodiments, the composite image generation system 106 performs various pre-processing steps to improve the results of later processing of the images in the sequence of images. In at least one embodiment, as part of performing the act 404, the composite image generation system 106 performs an act 406 of applying a median filter for noise removal. For example, the composite image generation system 106 utilizes a non-linear digital filtering technique to remove noise from the digital image 416. Additionally, in one or more embodiments, the composite image generation system 106 performs an act 408 of converting the image to a grayscale image. In particular, in some embodiments, the composite image generation system 106 converts the median filtered image to a grayscale image.

As further illustrated in FIG. 4, the composite image generation system 106 performs the act 410 of segmenting objects in the series of digital image. In particular, the composite image generation system 106 segments the objects utilizing a segmentation neural network 412. Generally, the segmentation neural network 412 partitions the image 416 into multiple segments or semantic regions by assigning a label to each pixel in the image 416.

In one or more embodiments the segmentation neural network 412 comprises a convolution neural network. In one or more embodiments, the neural network structure comprises a number of convolutional layers, with the same padding to preserve dimensions, so as to output a segmentation map having the same size as the input image. In such embodiments, the neural network learns a mapping from the input image through successive transformation of feature mappings.

To reduce computation requirements, in one or more embodiments, the segmentation neural network 412 utilizes an encoder/decoder structure that down-samples the spatial resolution of the input image, thereby developing lower-resolution feature mappings that are learned to be highly efficient at discriminating between classes. Furthermore, the segmentation neural network 412 up-samples the feature representations into a full-resolution segmentation map.

In one or more embodiments, the segmentation neural network 412 comprises a human segmentor (a neural network trained to segment humans in digital images). For example, in one or more embodiments, the segmentation neural network 412 comprises a U-net architecture with a contrasting path and an expansive path. The contracting path comprises repeated blocks of two 3×3 convolutions (unpadded convolutions), each followed by a rectified linear unit (ReLU) and a 2×2 max pooling operation with stride 2 for downsampling. The segmentation neural network 412 doubles the number of feature channels at each downsampling step. The expansive path comprises upsampling of the feature map at each step followed by a 2×2 convolution (i.e., an up-convolution) that halves the number of features channels, a concatenation with the correspondingly cropped feature map from the contracting path, and two 3×3 convolutions, which are each followed by a ReLU. The segmentation neural network 412 performs the cropping due to the loss of border pixels in every convolution. The final layer of the segmentation neural network 412 comprises a 1×1 convolution that is used to map each 64-component feature vector to a desired number of classes. In total, the segmentation neural network 412 comprises 23 convolutional layers. To allow for seamless tiling of the output segmentation map, the size of the input image is selected such that all 2×2 max-pooling operations are applied to a layer with an even x- and y-size. In one or more embodiments, the segmentation neural network 412 can comprise a U-net architecture and use techniques and approaches found in Olaf Ronneberger et al., "U-Net: Convolutional Networks for Biomedical Image Segmentation," submitted on May 18, 2015, arXiv:1505.049597, the entirety of which is incorporated by reference.

The segmentation neural network 412 can output a segmentation map where each pixel has a label corresponding to one of the predetermined number of classes. In one or more embodiments, the composite image generation system 106 identifies the objects by extracting segmentations masks (or segmented objects) 418a, 418b from the segmentation map. For example, the composite image generation system 106 can extract groupings of pixels that have the same associated labels. For example, as shown by FIG. 4, the segmentation neural network 412 can extract pixels having a "human" label to create segmentations masks 418a, 418b. In one or more embodiments, the segmentation neural network 412 is trained on a large number of classes. In such cases, the composite image generation system 106 can extract segmentations masks for each class of object and not just humans.

One will appreciate that the composite image generation system 106 can use any number of machine learning models to segment objects from the images. In other words, the composite image generation system 106 is not limited to using a segmentation neural network 412, or more specifically, a U-net neural network. For example, in one or more embodiments, the composite image generation system 106 utilizes an object detection neural network and an object mask neural network to segment object from the series of digital images. FIG. 5 and the corresponding discussion provide additional detail regarding embodiments in which the composite image generation system 106 utilizes an object detection neural network.

As mentioned previously, in one or more embodiments, the composite image generation system 106 utilizes an object detection model to detect and identify objects within images of a sequence of images. FIG. 5 illustrates one implementation of an object detection neural network that the composite image generation system 106 utilizes in accordance with at least one embodiment. In particular, FIG. 5 illustrates an object detection neural network 530 utilized by the composite image generation system 106 to detect objects. In one or more embodiments, the object detection neural network 530 comprises a deep learning convolutional neural network (CNN). For example, in some embodiments, the object detection neural network 530 comprises a region-based (R-CNN). While FIG. 5 illustrates one implementation of an object detection neural network 530, the composite image generation system 106 utilizes alternative implementations in other embodiments. For instance, another example of an object detection neural network is found in S. Ren, K. He, R. Girshick, and J. Sun, *Faster R-CNN. Towards real-time object detection with region proposal networks*, NIPS, 2015, the entire contents of which is hereby incorporated by reference.

As shown in FIG. 5, the object detection neural network 530 includes lower neural network layers 538 and higher neural network layers 540. In general, the lower neural network layers 538 collectively form an encoder and the higher neural network layers 540 collectively form a decoder (or potential object detector). In one or more embodiments, the lower neural network layers 538 are convolutional layers that encode images 534 (i.e., images from the sequence of images) into feature vectors, which are outputted from the lower neural network layers 538 and inputted to the higher neural network layers 540. In various implementations, the higher neural network layers 540 can comprise fully-connected layers that analyze the feature vectors and output the object proposals 542 (e.g., bounding boxes around potential objects) and the object proposal scores 544.

In particular, the lower neural network layers 538 can comprise convolutional layers that generate a feature vector in the form of a feature map. To generate the object proposals 542, the object detection neural network 530 processes the feature map utilizing a convolutional layer in the form of a small network that is slid across small windows of the feature map. The object detection neural network 530 then maps each sliding window to a lower-dimensional feature. The object detection neural network 530 then processes this feature using two separate heads that are fully connected layers. In particular, the first head can comprise a box-regression layer that generates the object proposals 542 and a box-classification layer that generates the object proposal scores 544. As noted above, for reach object proposal, the object detection neural network 530 can generate a corresponding object proposal score.

As mentioned, the object detection neural network 530 generates the object proposals 542. In some embodiments, and as illustrated in FIG. 5, the object proposals 542 comprise bounding boxes 546a-546c. For example, the each of the bounding boxes 546a-546c comprises an area that encompasses an object. In some embodiments, the composite image generation system 106 annotates the bounding boxes 546a-546c with labels such as the name of the detected object, the coordinates of the bounding box, and/or the dimension of the bounding box.

The object detection neural network 530 also generates the object proposal scores 544. In some embodiments, and as illustrated in FIG. 5, the object proposal scores 544 comprise confidence scores. In particular, the confidence score corresponds to a bounding box and label. The confidence score reflects a degree of confidence with which the object detection neural network 530 predicts the label for a particular bounding box. For example, the composite image generation system 106 identifies a confidence score of 0.94 associated with the label "Person 1" and the bounding box 546a. The confidence score 0.94 indicates that the object detection neural network 530 predicts with 0.94 confidence that the object within the bounding box 546a comprises a person.

As illustrated in FIG. 5, the object detection neural network 530 receives several object proposals for the image. In some instances, the composite image generation system 106 identifies all objects within the bounding boxes 546a-546c. For example, the bounding boxes 546a-546c comprise the approximate boundary area indicating the detected query object). An approximate boundary refers to an indication of an area including an object that is larger and/or less accurate than an object mask. In one or more embodiments, an approximate boundary can include at least a portion of a query object and portions of the image not comprising the query object. An approximate boundary can include any shape, such as a square, rectangle, circle, oval, or other outline surrounding an object. In one or more embodiments, an approximate boundary comprises a bounding box.

In other instances, to reduce the use of computing resources, the composite image generation system 106 must identify objects for manipulation from the object proposals. For example, as illustrated in FIG. 5, although the composite image generation system 106 receives object proposals for objects in the bounding boxes 546a-546c, the composite image generation system 106 identifies objects in the bounding boxes 546a-546b (i.e., the people jumping) as objects for manipulation. Though the composite image generation system 106 receives the bounding box 546b corresponding to the boat, the composite image generation system 106 determines to exclude the boat from further processing. In some embodiments, the composite image generation system 106 determines to select identified objects from the object proposals based on determining that the number of object proposals exceeds a threshold value. For example, based on determining that a single image includes more than three object proposals, the composite image generation system 106 determines to select from the object proposals.

The composite image generation system 106 identifies objects from object proposals using various methods. In some embodiments, the composite image generation system 106 automatically identifies objects based on object labels. In one embodiment, the composite image generation system 106 automatically identifies objects capable of motion as indicated by their labels (e.g., person, animal, car, etc.). The composite image generation system 106 may also automatically identify objects associated with a single label (e.g., people only).

In one or more embodiments, the composite image generation system 106 utilizes user input to identify objects from object proposals. In some embodiments, the composite image generation system 106 provides the object proposals for display via a graphical user interface to the user. The composite image generation system identifies objects based on the selected object proposals. Additionally, or alternatively, the composite image generation system 106 can generate new object proposals or modify object proposals based on user interaction. In one or more embodiments, the composite image generation system 106 provides the image for display to the user—with or without proposed bounding boxes. The composite image generation system 106 receives a user input indicating a location. For example, in one embodiment, the user indicates a location by clicking and dragging to create a rectangle element. In another embodiment, the user simply clicks a point and the composite image generation system 106 predicts a location comprising a predetermined radius about the point. In any case, the composite image generation system 106 receives the user input and applies the object detection neural network to the indicated location. Thus, in one or more embodiments, the composite image generation system 106 identifies objects with user assistance.

Upon identifying the objects in the images of the sequence of images, the composite image generation system 106 generates object masks for instances of the identified objects. Generally, instead of utilizing coarse bounding boxes during object localization, the composite image generation system 106 generates segmentations masks that better define the boundaries of the object. FIG. 6 and the corresponding discussions provide additional detail with respect to generating object masks for instances of identified objects in accordance with one or more embodiments. In particular, FIG. 6 illustrates the composite image generation system 106 utilizes an object mask neural network to generate a segmented object in accordance with some embodiments.

As illustrated in FIG. 6, the composite image generation system 106 processes an identified object in a bounding box 602 utilizing an object mask neural network 604 to generate an object mask 606 of the identified object. In alternative embodiments, the composite image generation system 106 utilizes the object detection neural network itself to generate an object mask of the identified object (e.g., segment the object for selection).

As mentioned, the composite image generation system 106 processes the bounding box 602 utilizing the object mask neural network 604. In some embodiments, the bounding box 602 comprises the output from the object detection neural network. For example, as illustrated in FIG. 6, the bounding box 602 comprises a rectangular border about the object.

The composite image generation system 106 utilizes the object mask neural network 604 to generate the object mask 606. For example, the object mask neural network 604 corresponds to one or more deep neural networks or models that select an object based on bounding box parameters corresponding to the object within an image. In some embodiments, the object mask neural network 604 utilizes the techniques and approaches found in Ning Xu et al., "Deep GrabCut for Object Selection," published Jul. 14, 2017, the entirety of which is incorporated herein by reference. For example, the object mask neural network 604 can utilize a deep grab cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which are incorporated herein by reference in their entirety.

In some embodiments, the composite image generation system 106 selects the object mask neural network 604 based on the class of the object identified by the object detection neural network. Generally, based on identifying one or more classes of objects associated with the input bounding boxes, the composite image generation system 106 selects an object mask neural network tuned to generate object masks for objects of the identified one or more classes. To illustrate, in some embodiments, based on determining that the class of one or more of the identified objects comprises a human or person, the composite image generation system 106 utilizes a special human object mask neural network to generate the object mask 606.

As further illustrated in FIG. 6, the composite image generation system 106 receives the object mask 606 as output from the object mask neural network 604. Generally, an object mask comprises a pixel-wise mask that corresponds to an object in an image. In one example, the object mask 606 includes a segmentation boundary indicating a predicted edge of one or more objects as well as pixels contained within the predicted edge.

Figure 7:
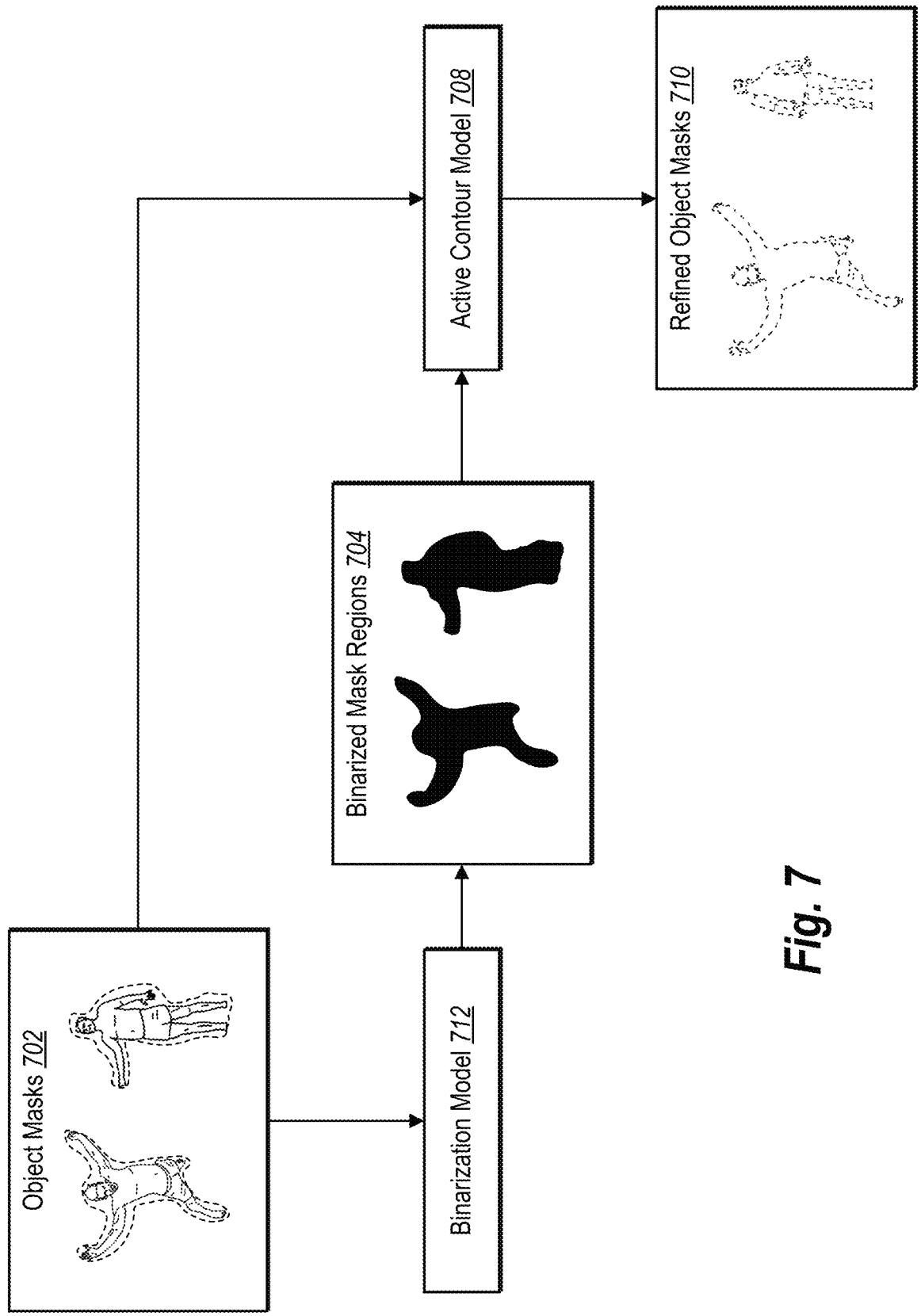
FIG. 7 illustrates the composite image generation system generating refined object masks in accordance with one or more embodiments of the present disclosure.

While, in some embodiments, the composite image generation system 106 utilizes the object mask 606 as the object mask in additional processing of the images, in other embodiments, the composite image generation system 106 generates a refined object mask. In particular, in some embodiments, the object mask neural network 604 or the segmentation neural network 412 struggles to produce fine-grained segmentations. For example, as illustrated in FIG. 6, though the object mask 606 provides more detail than the bounding box, the borders of the object mask 606 are rough and do not precisely trace the border of the object. FIG. 7 and the corresponding discussion provide additional detail with respect to the composite image generation system 106 refining the borders of an object mask (e.g., those generated by the object mask neural network 604 or the segmentation neural network 412) in accordance with one or more embodiments.

Generally, FIG. 7 illustrates the composite image generation system 106 processing object masks 702 utilizing a binarization model 712. The composite image generation system 106 utilizes the binarization model 712 to generate binarized mask regions 704. As illustrated, the composite image generation system 106 processes the binarized mask regions 704 together with the object masks 702 into an active contour model 708. The active contour model 708 further refines the boundaries identified by the binarization model 712 to generate refined object masks 710.

As mentioned, in some embodiments, the composite image generation system 106 utilizes the binarization model 712 to refine borders of the object masks 702. Generally, the binarization model 712 transforms data features of an entity (e.g., an image) into vectors of binary numbers. For example, in some embodiments, the composite image generation system 106 utilizes the binarization model 712 to convert a grayscale mask (i.e., the object mask 702) into a 0-1 spectrum binarized mask by a process of automatic image thresholding. In one or more embodiments, the binarization model 712 comprises an Otsu segmentation algorithm described in "A Threshold Selection Method from Gray-Level Histograms," by Nobuyuki Otsu, and published in IEEE Transactions on Systems, Man, and Cybernetics (Volume: 9, Issue: 1, January 1979), the entire contents of which is hereby incorporated by reference. In additional embodiments, the binarization model 712 comprises any other type of local thresholding based binarization algorithm such as a fixed thresholding method or the Kittler method described in Puneet and Naresh Kumar Garg, "Binarization Techniques used for Grey Scale Images," *International Journal of Computer Applications*, Volume 71-No. 1 (June 2013), the entirety of which is incorporated by reference.

The binarization model 712 outputs the binarized mask regions 704. Generally, the binarized mask regions 704 are, in large part, free of noise typically present in the object masks 702. The binarized mask regions 704 include approximate boundaries of the object. In some embodiments, the composite image generation system 106 utilizes the approximate boundary of the binarized mask regions 704 to define boundaries for object masks. In yet other embodiments, the composite image generation system 106 further refines the approximate boundaries of the binarized mask regions 704 to generate even more precise object masks.

As illustrated in FIG. 7, the composite image generation system 106 further refines approximate boundaries of the binarized mask regions 704 by utilizing an active contour model 708. Generally, the active contour model 708 identifies contours or boundaries of the objects in light of the approximate boundaries of the binarized mask regions 704. In particular, in some embodiments, the composite image generation system 106 utilizes the binarized mask regions 704 to initialize the active contour model 708. The active contour model 708 performs the following two functions: delineating an object outline from a possibly noisy image and forming a closed contour about the object. The active contour model 708 utilizes the binarized mask regions 704 to define an initial boundary and utilizes an iterative method to converge on the object boundary. Thus, and as illustrated in FIG. 7, the composite image generation system 106 inputs a pixel area about the object (e.g., the object masks 702)

together with the binarized mask regions 704 to the active contour model 708 to generate the refined object masks 710.

Examples of the active contour model 708 comprise a snakes model, a gradient vector flow snakes model, a balloon model, and geometric or geodesic contours. The above listed models are found in Kass, M. et al., "Snakes: Active contour models," International Journal of Computer Vision. 1 (4):321; C. Xu and J. L. Prince, "Gradient Vector Flow: A New External Force for Snakes," Proc. IEEE Conf. on Comp. Vis. Patt Recog. (CVPR), Los Alamitos: Comp. Soc. Press, pp. 66-71, June 1997, http://iacl.ece.jhu.edu/pubs/p087c.pdf; Laurent D. Cohen, On active contour models and balloons, CVGIP: Image Understanding, Volume 53, Issue 2, March 1991, Pages 211-218, ISSN 1049-9660; and Geodesic Active contours, V. Caselles, R. Kimmel, G. Sapiro, http://citeseerx.ist.psu.edu/viewdoc/summary?doi=10.1.1.21.2196, the entire contents of each of the foregoing articles are hereby incorporated by reference in their entirety.

As illustrated in FIG. 7, the composite image generation system 106 generates the refined object masks 710. In particular, the refined object masks 710 comprise more precise contours about the objects. For example, and as illustrated, whereas the object masks 702 include a rough boundary around the objects, the refined object masks 710 more precisely delineate details of the object even by outlining individual fingers.

In some embodiments, the composite image generation system 106 performs the acts illustrated in one or both of FIG. 4 (or 5 and 6) and 7 for generating object masks for each image in a sequence of images. Upon determining object masks and receiving user input selecting an object in a desired position, the composite image generation system 106 manipulates pixels associated with object masks in the images to generate a fixed object image. FIG. 8 illustrates a series of acts 800 by which the composite image generation system 106 generates a fixed object image in accordance with one or more embodiments. In particular, the series of acts 800 includes an act 802 of removing pixels in a region corresponding to an object mask of an object note selected as being in a target position, an act 804 of generating background pixels, and an act 806 of filling the region with background pixels.

As illustrated in FIG. 8, the composite image generation system 106 performs the act 802 of removing pixels in a region corresponding to an object mask of a non-selected object. In particular, the composite image generation system 106 identifies the object to manipulate in the image. For example, and as illustrated, the composite image generation system 106 determines (e.g., based on a user selection) that an object 808 is in the target position and accordingly determines to manipulate an object 810. The composite image generation system 106 accesses the object mask corresponding to the object 810. The composite image generation system 106 determines a region 812 in the image that corresponds to the object mask. The composite image generation system 106 removes or deletes the pixels in the region 812 corresponding to the object mask of the object 810.

As further illustrated in FIG. 8, the composite image generation system 106 performs the act 804 of generating background pixels. In particular, the composite image generation system 106 generates pixels within the region 812 corresponding to the object mask of the object 810. In some embodiments, the composite image generation system 106 computes the pixels within the region 812 by utilizing a content aware filling algorithm. For example, in at least one embodiment, the composite image generation system 106 utilizes a PatchMatch algorithm discussed in Connelly Barnes et al., "PatchMatch: A Randomized Correspondence Algorithm for Structural Image Editing," ACM Transactions on Graphics (Proc. SIGGRAPH), August 2009, which is incorporated herein by reference in its entirety. Furthermore, in some embodiments, the composite image generation system 106 computes pixels based on other images from the sequence of images. The composite image generation system 106 maps matching masks corresponding to the region 812 from other images to realistically fill pixels. In at least one embodiment, the composite image generation system 106 utilizes techniques and approaches found in U.S. Patent Application No. US20170287123A1, "Content Aware Fill Based on Similar Images," filed on Jun. 14, 2017, the entirety of which is incorporated herein by reference.

The series of acts 800 includes the act 806 of filling the region with background pixels. In particular, the composite image generation system 106 generates a fixed object image 814 by filling the region 812 with pixels computed in the previous step. In some embodiments, the composite image generation system 106 presents the fixed object image 814 for display via the graphical user interface at the user client device. Thus, the composite image generation system 106 provides an option for a user to select the fixed object image 814 as a final product image. In other embodiments, the composite image generation system 106 utilizes the fixed object image 814 to generate preview images of potential composite images.

As mentioned, in some embodiments the composite image generation system 106 presents a second object sequencing through a plurality of positions in preview images. FIG. 9 illustrates a series of acts 900 by which the composite image generation system 106 generates preview images in accordance with one or more embodiments. In particular, FIG. 9 illustrates an act 904 of accessing second object masks from images and an act 906 of superimposing the second object masks over the fixed object image.

As illustrated in FIG. 9, the series of acts 900 begins with a fixed object image. In particular, the composite image generation system 106 generates a fixed object image 912 as described above with respect to FIG. 8. For example, and as illustrated, the fixed object image 912 includes a first object 910 in a first position with the second object removed and replaced by background pixels.

The composite image generation system 106 performs the act 904 of accessing second object masks from the series of images. In particular, the composite image generation system 106 retrieves object masks associated with the second object (i.e., the object to be manipulated) across all images in the sequence of images. For example, and as illustrated in FIG. 9, the composite image generation system 106 identifies an object mask 918*a* corresponding to an object 916*a* in a digital image 914*a*. The composite image generation system 106 also identifies an object mask 918*b* corresponding to an object 916*b* in a digital image 914*b*.

The series of acts 900 also includes an act 906 of superimposing the second object mask over the fixed object image. Generally, the composite image generation system 106 generates preview images 920*a*-920*b* by superimposing the object masks 918*a*-918*b* over the fixed object image 912. More specifically, in some embodiments, the composite image generation system 106 replaces regions corresponding to the locations of the object masks 918*a*-918*b* with pixels within the object masks 918*a*-918*b*. Thus, the composite image generation system 106 generates the preview images 920*a*-920*b* displaying the second object sequencing through various positions from the sequence of images.

The acts and algorithms associated with FIGS. 4, 8, and 9 can comprises supporting structure for performing a step for generating previews of the first object in the first position and the second object in a plurality of positions from the sequence of images. Still further, the acts and algorithms associated with FIGS. 4, 7, 8, and 9 can comprises supporting structure for performing a step for generating previews of the first object in the first position and the second object in a plurality of positions from the sequence of images in one or more embodiments. Alternatively, the acts and algorithms associated with FIGS. 5, 6, 8, and 9 can comprises supporting structure for performing a step for generating previews of the first object in the first position and the second object in a plurality of positions from the sequence of images.

As previously mentioned, the composite image generation system 106 provides, for display at a client device, an intuitive and efficient graphical user interface for presenting the sequence of images, preview images, and a composite image. Additionally, the graphical user interface receives user input for indicating target positions of objects within the digital images. FIGS. 10A-10B illustrate a series of example position selection graphical user interfaces in accordance with one or more embodiments. In particular, FIG. 10A illustrates an example position selection graphical user interface 1004 for receiving a selection of a first object in a first position (i.e., a target position), and FIG. 10B illustrates the example position selection graphical user interface 1004 updated to receive a selection of a second object in a second position in accordance with at least one embodiment.

FIG. 10A illustrates the position selection graphical user interface 1004 on a screen 1002 of a user client device 1000 (e.g., the user client device 108). As illustrated in FIG. 10A, the position selection graphical user interface 1004 includes a load video element 1006, a load burst images element 1008, a digital image display element 1010, and a target position selection element 1018.

As shown in FIG. 10A, the position selection graphical user interface 1004 includes the load video element 1006 and the load burst images element 1008. Based on selection of the load video element 1006 or the load burst images element 1008, the composite image generation system 106 receives and uploads a digital video or a sequence of burst images, respectively. While FIG. 10A illustrates the load video element 1006 and the load burst images element 1008 as separate user interface elements, in some embodiments, the position selection graphical user interface 1004 includes a single load media element by which the composite image generation system 106 receives video or image files.

In some embodiments, though not illustrated in FIG. 10A the position selection graphical user interface 1004 provides additional user interface elements for modifying an uploaded sequence of images. In one example, upon selection of the load video element 1006 or the load burst images element 1008, the user client device 1000 updates the position selection graphical user interface 1004 to include an image selection element by which a user selects images to include within the sequence of images. In some embodiments, the image selection element includes features and elements for the selection of individual images, a range of individual images (e.g., by cropping the length of a video), the number of individual images, intervals between images from a video file, and other upload modification options.

Upon upload of the sequence of images (i.e., a video or burst images), the composite image generation system 106 segments the objects in the sequence of images using one or more of the techniques described above in relation to FIGS. 4-7. In other words, the composite image generation system 106 can perform pre-processing to segment objects one time in a manner that the segmentation generation does not need to be repeated no matter which objects or positions of objects the user selects.

As shown, the position selection graphical user interface 1004 includes the digital image display element 1010. Generally, the digital image display element 1010 presents digital images within the sequence of images. As illustrated in FIG. 10A, the digital image display element 1010 includes a single digital image. Furthermore, the digital image display element 1010 provides various elements for navigating digital images within the sequence of images. For example, the digital image display element 1010 includes a play sequence element 1014, a sequence navigation element 1022 and a current image indicator 1016.

Based on selection of the digital image display element 1010, the user client device 1000 updates the position selection graphical user interface 1004 to automatically display digital images in sequential order. In some embodiments, based on determining that the user selects the play sequence element 1014 a second time, the user client device 1000 pauses the display on a single digital image. Additionally, or alternatively, the composite image generation system 106 presents digital images based on user interaction with the sequence navigation element 1022. In some embodiments, the sequence navigation element 1022 comprises a scroll bar, a scrubber bar, or another type of navigation feature. In some embodiments, the composite image generation system 106, upon determining a user has selected and dragged the current image indicator 1016 along the sequence navigation element 1022, navigates to a digital image at a particular time within the sequence of images.

As further shown in FIG. 10A, digital images displayed via the digital image display element 1010 include selectable objects. In particular, before displaying digital images via the position selection graphical user interface 1004, the composite image generation system 106 determines object masks for objects within each digital image in the sequence of images. As illustrated in FIG. 10A, the user client device 1000 receives a selection of a first object 1012 in the digital image.

In some embodiments, the digital image display element 1010 includes digital images that indicate selectable objects. In some embodiments, the composite image generation system 106 indicates selectable objects by changing colors of the selectable objects (i.e., objects associated with object masks) or changing colors of the background (i.e., everything but the selectable objects). In one example, the composite image generation system 106 converts the background to grayscale while maintaining colors of the selectable objects. In some embodiments, the composite image generation system indicates selectable objects by drawing borders around the selectable objects.

In addition to indicating selectable objects, in some embodiments, the position selection graphical user interface 1004 includes elements for creating new object masks for new or different objects within the sequence of images. In one example, though not illustrated in FIG. 10A, the position selection graphical user interface 1004 includes an edit objects element. Based on selection of the edit objects element, the composite image generation system 106 provides options by which the user may suggest new or different objects. For example, the composite image generation system 106 receives a user input indicating a first location in an image via the position selection graphical user interface

1004. Based on this user input, the composite image generation system 106 either selects objects previously identified within the location or utilizes the object detection neural network to identify an object within the location.

The position selection graphical user interface 1004 in FIG. 10A includes a save frame element 1020. Based on user selection of the save frame element 1020, the composite image generation system 106 saves the digital image currently displayed in the digital image display element 1010. In at least one embodiment, selection of the save frame element 1020 causes the user client device 1000 to download the currently displayed digital image.

As further illustrated in FIG. 10A, the position selection graphical user interface 1004 includes the target position selection element 1018. In particular, selection of the target position selection element 1018 indicates that the selected object is in the target position. Based on selection of the target position selection element 1018, the composite image generation system 106 creates a fixed object image comprising the selected object (e.g., the first object 1012) in a fixed position. Additionally, the composite image generation system 106 provides, for display via the position selection graphical user interface 1004, preview images comprising the fixed object image with the second object sequencing through a plurality of positions.

In particular, FIG. 10B illustrates the position selection graphical user interface 1004 updated to include a preview image display element 1026. As shown in FIG. 10B, the position selection graphical user interface 1004 includes the digital image display element 1010 displaying a first image 1024. Additionally, the position selection graphical user interface 1004 in FIG. 10B includes the preview image display element 1026 and the save frame element 1020.

The position selection graphical user interface 1004 illustrated in FIG. 10B includes the digital image display element 1010. In particular, the digital image display element 1010 displays the first image 1024. More specifically, the first image 1024 comprises the first object selected by the user. In some embodiments, the user continues to interact with the digital image display element 1010 to make a new selection of an object in a target position. For example, the user may utilize the sequence navigation element to navigate to a new digital image. Based on a second selection of the target position selection element 1018, the composite image generation system 106 generates a new fixed object image and updates the preview image display element 1026 to include preview images based on the new fixed object image.

The position selection graphical user interface 1004 illustrated in FIG. 10B also includes the preview image display element 1026. The preview image display element 1026 displays the sequence of preview images comprising the fixed object image with the second object sequencing through a plurality of positions. As illustrated in FIG. 10B, the preview image display element 1026 includes the first object 1012 in a fixed first position. Furthermore, the image display element includes a second object 1028, a play preview element 1034, a preview navigation element 1032, and a current preview indicator 1030. In some embodiments, the user client device 1000 updates the preview image display element to show the second object 1028 sequencing through a plurality of positions based on user interaction with the play preview element 1034, the preview navigation element 1032, and the current preview indicator 1030.

To illustrate, in some embodiments, based on selection of the play preview element 1034, the user client device 1000 updates the preview image display element 1026 to automatically show the second object 1028 sequencing through the plurality of positions. Additionally, based on a user selecting and dragging the current preview indicator 1030 to different spots along the preview navigation element 1032, the user client device 1000 updates the preview image display element 1026 to display the second object 1028 in various positions corresponding to various spots along the preview navigation element 1032.

As further illustrated in FIG. 10B, the position selection graphical user interface 1004 includes the save frame element 1020. Based on user selection of the save frame element 1020, the composite image generation system 106 generates a composite image based on the currently displayed image within the preview image display element 1026. For example, the composite image generation system 106 generates a composite image comprising the first object 1012 in a first position and the second object 1028 in a second position as displayed via the preview image display element 1026. Additionally, in some embodiments, the user client device 1000 downloads the composite image generated by the composite image generation system 106 based on selection of the save frame element 1020.

The composite image generation system 106, thus, allows a user to generate a composite image that display or includes a plurality of objects in desired positions. For example, the user can select the save frame option 1020 to generate a composite digital image from a selected preview image. In the illustrated example, the composite image generation system 106 allows a user to generate a composite digital image comprising both people in the air jumping off the boat despite no single image in the sequence of images depicting the people together in these positions. Furthermore, the user need only provide one or two selections in order to generate the composite digital image. Indeed, a user need only select an image with a first object in a desired position and then select a preview image showing a second object in a desired position. Thus, the composite image generation system 106 removes the time-consuming editing required by conventional systems and allows for creation of desired composite images on hand-held devices with ease.

Figure 11:
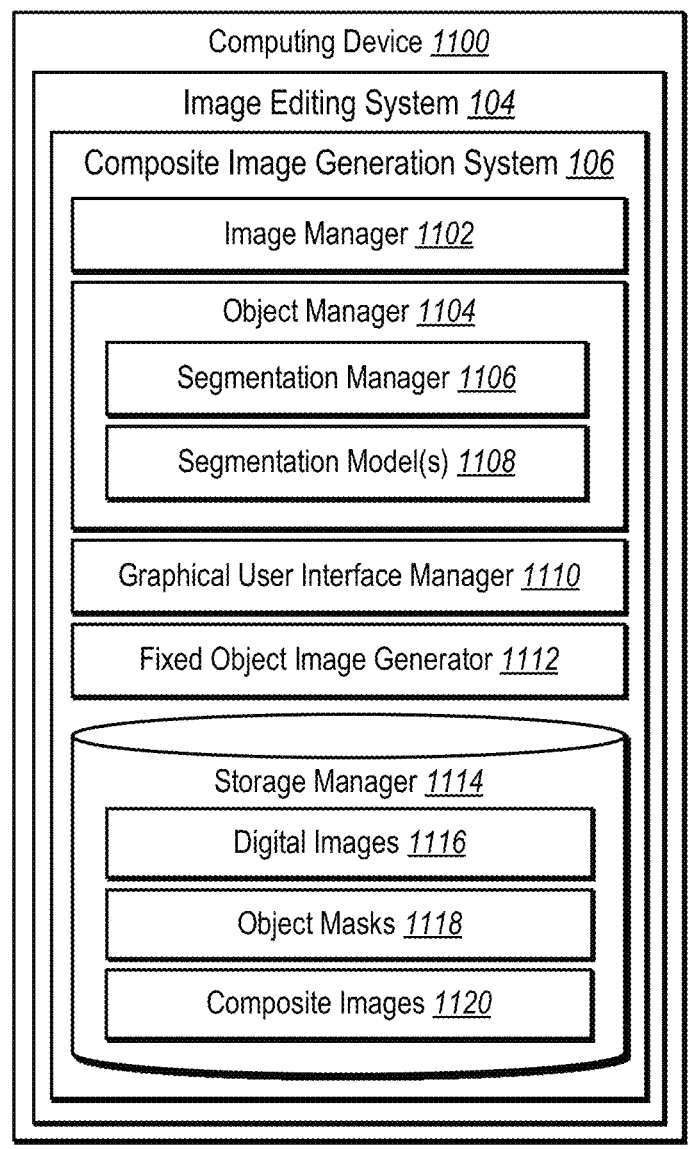
FIG. 11 illustrates a schematic diagram of an example architecture of the composite image generation system in accordance with one or more embodiments of the present disclosure.

FIG. 11 illustrates a schematic diagram of components of the composite image generation system 106 in accordance with one or more embodiments. As shown, the composite image generation system 106 is implemented by a computing device 1100 (e.g., the user client device 108 and/or the server device(s) 102). Additionally, in some embodiments, the composite image generation system 106 is part of the image editing system 104. The composite image generation system 106. The composite image generation system 106 can include, but is not limited to, an image manager 1102, an object manager 1104, a graphical user interface manager 1110, a fixed object image generator 1112, and a storage manager 1114. In some embodiments, the composite image generation system 106 is implemented as part of the image editing system 104 in a distributed system of the server devices for generating and editing digital images. Additionally, or alternatively, the composite image generation system 106 is implemented on a single computing device such as the user client device 108 of FIG. 1.

In one or more embodiments, each of the components of the composite image generation system 106 are in communication with one another using any suitable communication technologies. Additionally, the components of the composite image generation system 106 can be in communication with one or more other devices including the user client device 108 illustrated in FIG. 1. Although the components of the composite image generation system 106 are shown as separate in FIG. 11, any of the subcomponents may be combined into fewer components, such as into a single component or divided into more components as may serve a particular implementation. Furthermore, although the components of FIG. 11 are described in connection with the composite image generation system 106, at least some components for performing operations in conjunction with the composite image generation system 106 described herein may be implemented on other devices within the environment.

The components of the composite image generation system 106 can include software, hardware, or both. For example, the components of the composite image generation system 106 can include one or more instructions stored on a computer-readable storage medium and executable by processors of one or more computing devices (e.g., the user client device 108). When executed by the one or more processors, the computer-executable instructions of the composite image generation system 106 can cause the computing devices to perform the composite image generation methods described herein. Alternatively, the components of the composite image generation system 106 can comprise hardware, such as a special purpose processing device to perform a certain function or group of functions. Additionally, or alternatively, the components of the composite image generation system 106 can include a combination of computer-executable instructions and hardware.

Furthermore, the components of the composite image generation system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the composite image generation system 106 may be implemented as part of a stand-alone application on a personal computing device or a mobile device. Alternatively or additionally, the components of the composite image generation system 106 may be implemented in any application that allows creation and delivery of marketing content to users, including, but not limited to, applications in ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTO SHOP," and "CREATIVE CLOUD" are registered trademarks of Adobe Inc in the United States and/or other countries.

Figure 12:
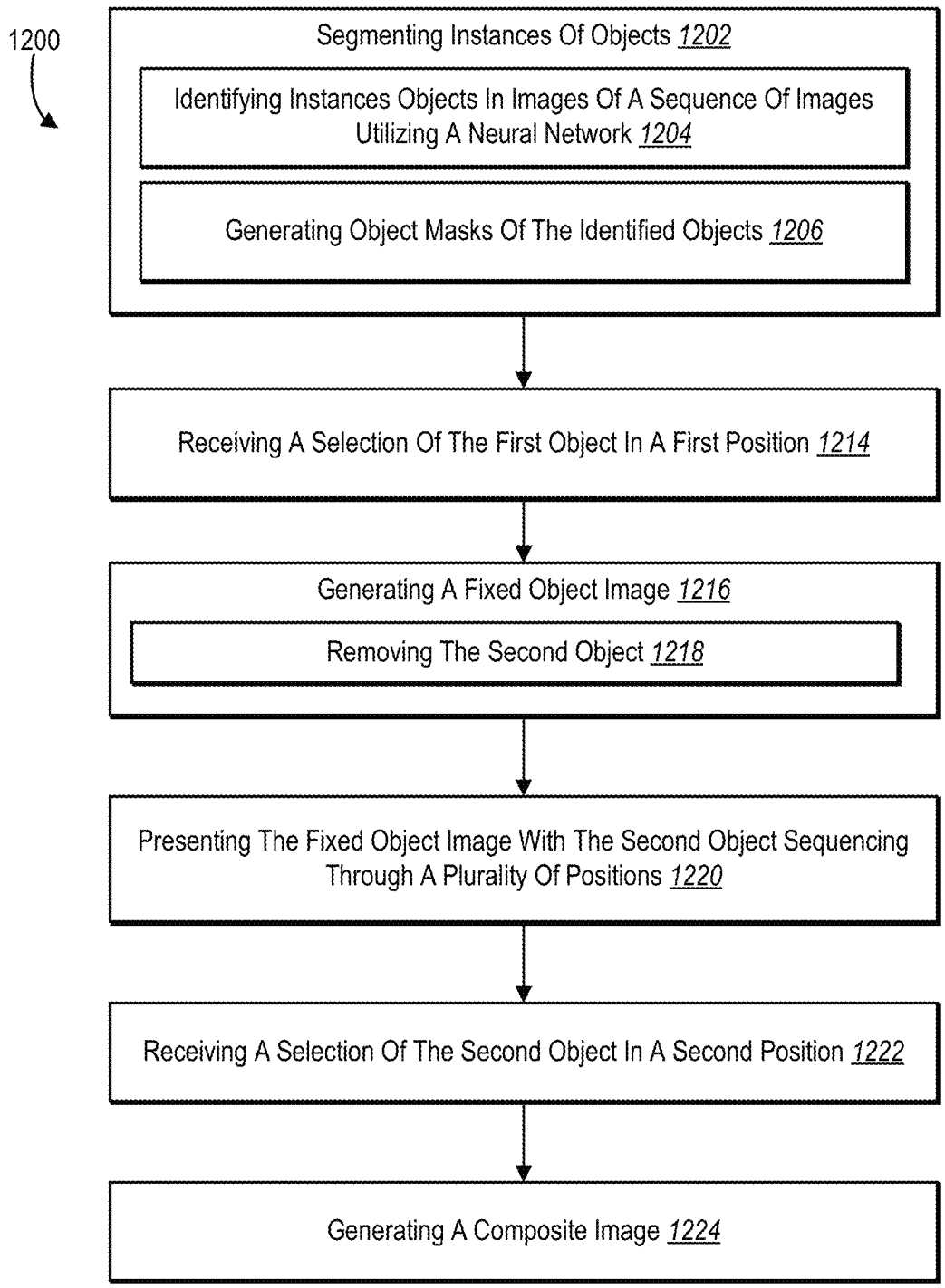
FIG. 12 illustrates a series of acts for generating a composite image from a sequence of images comprising objects in various positions in accordance with one or more embodiments of the present disclosure.

As shown in FIG. 11, the composite image generation system 106 is located on the computing device 1100 within the image editing system 104. In general, the computing device 1100 represents various types of client devices. For example, in some embodiments, the computing device 1100 comprises a non-mobile device, such as a desktop or server, or another type of client device. FIG. 12 and the corresponding discussion provide additional details with regard to the computing device 1100.

The composite image generation system 106 includes the image manager 1102. The image manager 1102 receives, stores, generates, edits, and manages digital images. For instance, the image manager 1102 receives and organizes digital images within a sequence of digital images. Furthermore, the image manager 1102 can extract digital images. For example, based on receiving a digital video, the image manager 1102 extracts digital images at predetermined intervals. The image manager 1102 also stores, edits, and manages metadata associated with the digital images. In particular, the image manager 1102 stores metadata including the time a digital image was captured and the order of digital images within a sequence of digital images.

As further shown in FIG. 11, the composite image generation system 106 includes the object manager 1104. Generally, the object manager 1104 identifies, stores, edits, and manages data associated with objects within digital images. More specifically, the object manager 1104 includes segmentation manager 1106 and one or more segmentation models 1108 (e.g., segmentation neural network 412, object detection neural network 530, and/or object mask neural network 604).

The segmentation manager 1106 stores, trains, and applies the various segmentation models utilized by the composite image generation system 106. In particular, the segmentation manager 1106 trains and applies the segmentation neural network 412, object detection neural network 530, and/or object mask neural network 604. During training, the segmentation manager accesses training data including training images and ground truth object masks. The segmentation manager 1106 adjusts parameters of the neural network to reduce loss. During application, the segmentation manager 1106 accesses sequences of images to utilize as input into the segmentation model(s) 1108. The object detection model manager 1106 also manages output bounding boxes, labels, and confidence scores associated with images.

Generally, the segmentation manager 1106 generates, refines, manages, and stores object masks. In particular, the segmentation manager 1106 stores, trains, and applies the various neural networks utilized by the composite image generation system 106. Furthermore, the segmentation manager 1106 refines detected object boundaries to generate refined object masks. In particular, the segmentation manager 1106 stores, trains, and applies machine learning models utilized in generating refined object masks. In particular, the segmentation manager 1106 stores, trains, and applies various binarization models and active contour models.

As shown in FIG. 11, the composite image generation system 106 includes the graphical user interface manager 1110. The graphical user interface manager 1110 generates, manages, and receives user input from one or more graphical user interfaces. The graphical user interface manager 1110 generates, at the user client device 108, graphical user interfaces that present images of the sequence of images as well as a fixed object image with an object sequencing through a plurality of positions. The graphical user interface manager 1110 also receives user interaction with one or more of the mentioned elements or objects and communicates the user interaction to the fixed object image generator 1112. Additionally, the graphical user interface manager 1110 displays composite images.

As further illustrated in FIG. 11, the composite image generation system 106 includes the fixed object image generator 1112. The fixed object image generator 1112 generates, accesses, manages data associated with fixed object images. In particular, the fixed object image generator 1112 communicates with the graphical user interface manager 1110 to access user interactions to determine target positions for objects and objects that will be manipulated. Additionally, in some embodiments, the fixed object image generator 1112 also generates preview images in which a first object is fixed in a position and a second object (and additional objects) sequences through a plurality of positions.

The composite image generation system 106 includes the storage manager 1114. The storage manager 1114 stores (via one or more memory devices) digital images 1116, object masks 1118, and composite images 1120. In particular, the digital images 1116 includes sequences of images received by the composite image generation system 106. In some embodiments, the digital images 1116 include burst image data as well as video data received by the composite image generation system 106.

The storage manager 1114 includes the object masks 1118. The object masks 1118 includes data relevant to the generation of object masks. For example, the object masks 1118 includes object masks, binarized mask regions, and/or refined object masks. Additionally, in some embodiments, the object masks 1118 also includes pixels in the image that correspond to a region associated with the object masks.

As further illustrated in FIG. 11, the storage manager 1114 also includes the composite images 1120. The composite images 1120 comprise images generated by the composite image generation system 106. More particularly, the composite images 1120 include images depicting objects in different positions from more than one image.

FIG. 12 illustrates a series of acts 1200 for generating a composite image. While FIG. 12 illustrates acts according to one embodiment, alternative embodiments may omit, add to, reorder, and/or modify any of the acts shown in FIG. 12. The acts of FIG. 12 can be performed as part of a method. Additionally, or alternatively, a non-transitory computer readable medium can comprise instructions that, when executed by one or more processes, cause the computing device to perform the acts of FIG. 12. In yet other embodiments, a system performs the acts illustrated in FIG. 12.

As illustrated in FIG. 12 the series of acts 1200 includes an act 1202 of segmenting instances of objects. In particular, the act 1202 comprises the act 1204 of identifying instances of a first object and a second object in a sequence of images utilizing a neural network. The sequence of images comprises frames from an input video or a plurality of burst images. Alternatively, the sequence of images comprises consecutively captured digital images that are not burst mode images or a video. In one or more embodiments, the act 1204 comprises processing the images utilizing a segmentation neural network. In such embodiments, act 1204 involves assigning pixels of images of the sequence of images labels utilizing the segmentation neural network and grouping pixels with the same label.

In one or more embodiments, act 1202 involves generate filtered images by removing noise from the images of the sequences of images utilizing a median filter and creating gray images from the filtered images. Act 1202 then involves utilizing the grayscale images as input to the segmentation neural network to generate labels for pixels of the images in the sequence of images.

The act 1202 comprises the act 1206 of generating object masks. In one or more embodiments, the act 1206 involves extracting groups of pixels with the same label. For example, act 1206 involves extracting adjacent pixels to each other that share the same label. In particular, act 1206 involves extracting pixels with a human label.

Act 1202 also optionally involves generating refined object mask and utilizing the refined object masks when generating a fixed object image or image previews. For example, act 1202 can involve processing the object mask utilizing a binarization model to generate binarized masks comprising approximate boundaries of instances of the first and second objects. Then act 1202 involves refining the approximate boundaries of the binarized masks utilizing an active contour model to generate refined object masks.

As mentioned in one or more embodiments, act 1202 involves utilizing a segmentation neural network. In alternative embodiments, act 1202 involves segmenting the instances of the first object and the second object by detecting the first object and the second object in images of the sequence of images utilizing an object detection neural network. In such embodiments, act 1202 involves generating bounding boxes and corresponding labels for objects within the images of the sequences of images utilizing the object detection neural network. Act 1202 then involves generating the object masks for the instances of the first object and the second object in the images of the sequences of images by processing the bounding boxes utilizing an object mask neural network.

As shown in FIG. 12, the series of acts 1200 includes an act 1214 of receiving a selection of the first object in a first position. In particular, the act 1214 comprises receiving, via a graphical user interface at a user client device, a selection of the first object in a first position from a first image.

The series of acts 1200 also includes an act 1216 of generating a fixed object image. In one or more embodiments, the act 1216 includes an act 1218 of removing the second object from the first image. In particular, the act 1216 comprises based on the selection, generating a fixed object image comprising the first object fixed in the first position. More specifically, in some embodiments, the act 1216 comprises based on the selection, generate a fixed object image comprising the first object fixed in the first position by removing an object mask of the second object from the first image. Act 1216 also involves generating background pixels to fill in pixels of the removed second object. In particular, act 1216 can involve analyzing corresponding regions in images of the sequence of images utilizing a content aware filling algorithm.

Furthermore, the series of acts 1200 includes an act 1220 of presenting the fixed object image with the second object sequencing through a plurality of positions. In particular, the act 1220 comprises presenting, via the graphical user interface, the fixed object image with the first object fixed in the first position and the second object sequencing through a plurality of positions by superimposing object masks of the second object in the plurality of positions from the sequence of images.

As shown in FIG. 12, the series of acts 1200 includes an act 1222 of receiving a selection of the second object in a second position. In particular, the act 1222 comprises receiving, via the graphical user interface, a selection of the second object in a second position from a second image of the sequence of images.

The series of acts 1200 includes an act 1224 of generating a composite image. In particular, the act 1224 comprises based on the selection of the second object, generating a composite image comprising the first object in the first position and the second object in the second position by inserting the object mask corresponding to the second object in the second position into the fixed object image.

In one or more embodiments, act 1224 comprises generating the composite image comprising the first object in the first position and the second object in the second position by generating an image without the second object due to the second position being outside of a frame of the second image.

The series of acts 1200 optionally involves segmenting an instance of a third object in the sequence of images by generating a third object mask for the instance of the third object in the composite image. The series of acts 1200 then involves generating a second fixed object image comprising the first object in the first position and the second object in the second position by removing pixels in a region corresponding to the third object mask from the fixed object image. The series of acts 1200 then involves presenting, via the graphical user interface, the second fixed object image with the first object fixed in the first position, the second object fixed in the second position, and the third object sequencing through two or more positions by superimposing the third object in the two or more positions from the sequence of images. The series of acts 1200 then involves receiving, via the graphical user interface, a selection of the third object in a third position from a third image of the sequence of images. Then the series of acts 1200 involves, based on the selection of the third object, generating a second composite image comprising the first object in the first position, the second object in the second position, and the third object in the third position.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
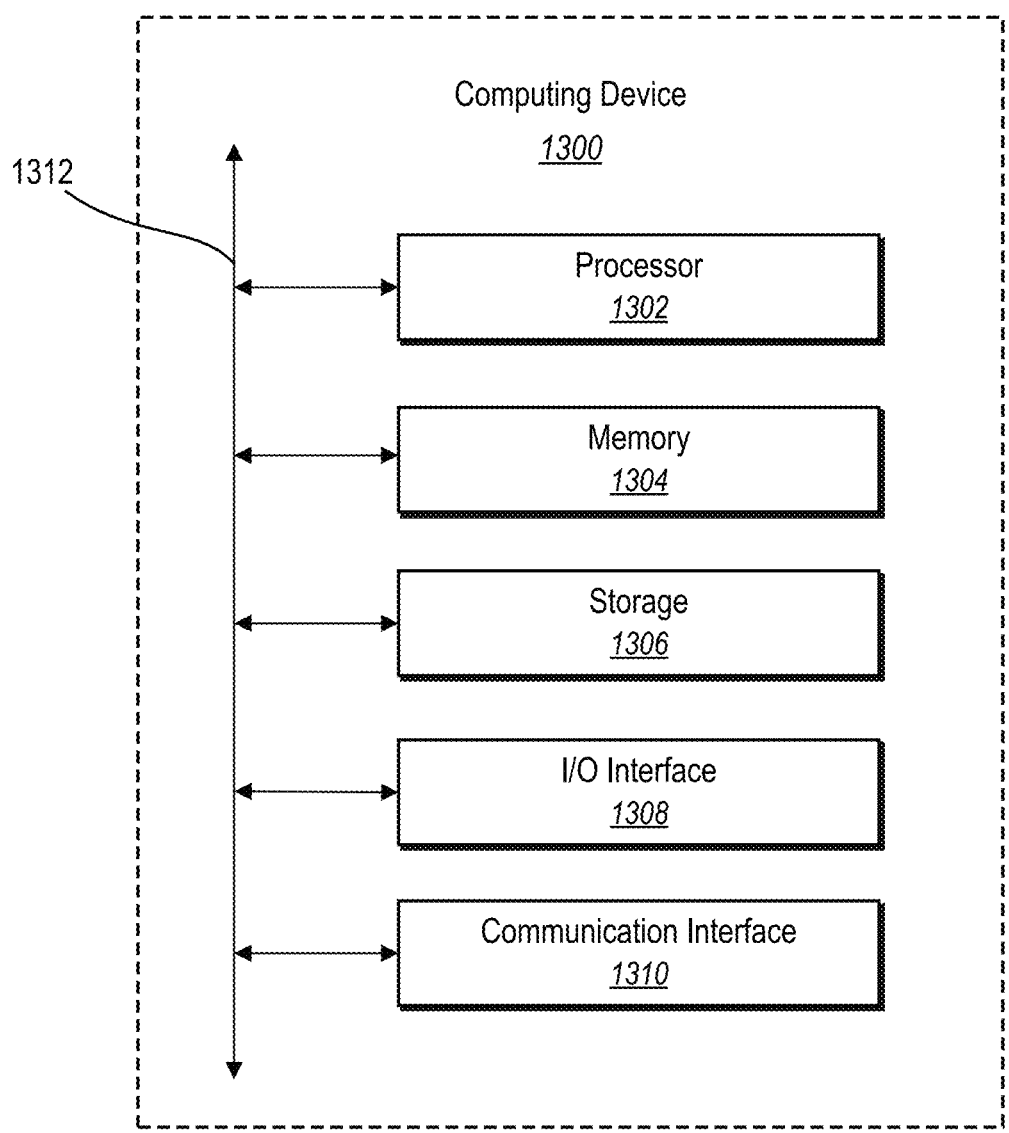
FIG. 13 illustrates a block diagram of an example computing device in accordance with one or more embodiments of the present disclosure.

FIG. 13 illustrates a block diagram of a computing device 1300 that may be configured to perform one or more of the processes described above. One will appreciate that one or more computing devices such as the computing device 1300 may implement the composite image generation system 106 and the image editing system 104. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable medium for generating images, the non-transitory computer readable medium comprising instructions that, when executed by at least one processor, cause the at least one processor to:
segment instances of a first object and a second object in a sequence of images;
receive, via a graphical user interface at a user client device, a selection of the first object in a first position from a first image;
based on the selection, generate a fixed object image comprising the first object fixed in the first position by:
removing, from the first image, pixels in a region corresponding with the second object; and
filling the region with background pixels;
present, via the graphical user interface, a sequence of preview images comprising the second object sequencing through a plurality of different positions from images in the sequence of images, wherein each preview image of the sequence of preview images comprises the fixed object image with the first object fixed in the first position and a segmented instance of the second object superimposed in a position of the plurality of different positions from an image of the sequence of images;
receive, via the graphical user interface, a selection of a preview image from the sequence of preview images, the preview image comprising the fixed object image with the first object fixed in the first position and the second object in a second position from a second image in the sequence of images; and based on the selection of the preview image, generate a composite image comprising the first object in the first position and the second object in the second position as shown in the preview image.

2. The non-transitory computer readable medium as recited in claim 1, further comprising instructions that, when executed by the at least one processor, cause the at least one processor to segment the instances of the first object and the second object by assigning, to pixels of images of the sequence of images, labels utilizing a segmentation neural network.

3. The non-transitory computer readable medium as recited in claim 2, further comprising instructions that, when executed by the at least one processor, cause the at least one processor to generate object masks for instances of the first object and the second object by extracting groups of pixels with a same label.

4. The non-transitory computer readable medium as recited in claim 1, further comprising instructions that, when executed by the at least one processor, cause the at least one processor to segment the instances of the first object and the second object by detecting the first object and the second object in images of the sequence of images utilizing an object detection neural network.

5. The non-transitory computer readable medium as recited in claim 1, further comprising instructions that, when executed by the at least one processor, cause the at least one processor to generate the composite image by inserting a segmented second object in the second position into the fixed object image.

6. The non-transitory computer readable medium as recited in claim 1, further comprising instructions that, when executed by the at least one processor, cause the at least one processor to remove the pixels in the region corresponding with the second object by:
   segmenting an instance of the second object by generating an object mask for the instance of the second object; and
   removing the object mask comprising the second object from the first image.

7. The non-transitory computer readable medium as recited in claim 1, further comprising instructions that, when executed by the at least one processor, cause the at least one processor to:
   present, via the graphical user interface, a sequence navigation element; and
   based on user interaction with the sequence navigation element, display the second object in various positions corresponding to various spots along the sequence navigation element.

8. The non-transitory computer readable medium as recited in claim 1, wherein the sequence of images comprises frames from an input video or a plurality of burst images.

9. The non-transitory computer readable medium as recited in claim 1, wherein the second position comprises a position outside a frame of the second image.

10. A system comprising:
   at least one non-transitory computer readable storage medium storing a sequence of images; and
   at least one processor configured to cause the system to:
      segment instances of a first object and a second object utilizing a neural network by generating object masks for instances of the first object and the second object in images of the sequence of images;
      receive, via a graphical user interface at a user client device, a selection of the first object in a first position from a first image;
      based on the selection, generate a fixed object image comprising the first object fixed in the first position by:
         removing, from the first image, pixels in a region corresponding to an object mask comprising the second object from the first image; and
         filling the region with background pixels;
      present, via the graphical user interface, a sequence of preview images comprising the second object sequencing through a plurality of different positions from images in the sequence of images, wherein each preview image of the sequence of preview images comprises the fixed object image with the first object fixed in the first position and a segmented instance of the second object superimposed in a position of the plurality of different positions from an image of the sequence of images;
      receive, via the graphical user interface, a selection of a preview image from the sequence of preview images, the preview image comprising the fixed object image with the first object fixed in the first position and the second object in a second position from a second image in the sequence of images; and
      based on the selection of the preview image, generate a composite image comprising the first object in the first position and the second object in the second position as shown in the preview image by inserting the object mask corresponding to the second object in the second position into the fixed object image.

11. The system as recited in claim 10, wherein the at least one processor is further configured to cause the system to segment instances of the first object and the second object utilizing a segmentation neural network to label pixels of the images in the sequence of images.

12. The system as recited in claim 11, wherein the at least one processor is further configured to cause the system to:
   generate filtered images by removing noise from the images of the sequence of images utilizing a median filter;
   creating grayscale images from the filtered images; and
   utilizing the grayscale images as input to the segmentation neural network.

13. The system as recited in claim 10, wherein:
   the at least one processor is further configured to cause the system to segment instances of the first object and the second object by utilizing an object detection neural network to generate bounding boxes and corresponding labels for objects within the images of the sequence of images; and
   generating the object masks for the instances of the first object and the second object in the images of the sequence of images comprises processing the bounding boxes utilizing an object mask neural network to generate the object masks.

14. The system as recited in claim 10, wherein the at least one processor is further configured to cause the system to generate the fixed object image by utilizing a content aware filling algorithm to generate the background pixels for the region corresponding to the second object.

15. The system as recited in claim 14, wherein the at least one processor is further configured to cause the system to generate the background pixels for the region based on analyzing corresponding regions in images of the sequence of images.

16. The system as recited in claim 10, wherein the at least one processor is further configured to cause the system to identify the instances of the first object and the second object by:
- receiving, via the graphical user interface, a first user input indicating a first location and a second user input indicating a second location in an image of the sequence of images;
- detecting the first object based on the neural network and the first location; and
- detecting the second object based on the neural network and the second location.

17. The system as recited in claim 10, wherein the at least one processor is further configured to cause the system to:
- segment an instance of a third object in the sequence of images by generating a third object mask for the instance of the third object in the composite image;
- generate a second fixed object image comprising the first object in the first position and the second object in the second position by removing pixels in a region corresponding to the third object mask from the fixed object image;
- present, via the graphical user interface, the second fixed object image with the first object fixed in the first position, the second object fixed in the second position, and the third object sequencing through two or more positions by superimposing the third object in the two or more positions from the sequence of images;
- receive, via the graphical user interface, a selection of the third object in a third position from a third image of the sequence of images; and
- based on the selection of the third object, generate a second composite image comprising the first object in the first position, the second object in the second position, and the third object in the third position.

18. The system as recited in claim 10, wherein generating object masks for instances of the first object and the second object in the images of the sequence of images comprises:
- generating binarized masks comprising approximate boundaries for the instances of the first object and the second object; and
- refining the approximate boundaries of the binarized masks utilizing an active contour model.

19. In a digital medium environment for generating images, a computer-implemented method comprising:
- segmenting instances of a first object and a second object in a sequence of images;
- receiving, via a graphical user interface, a selection of the first object in a first position from a first image;
- generating a sequence of preview images comprising the second object sequencing through a plurality of different positions from images in the sequence of images, wherein each preview image of the sequence of preview images comprises the first object fixed in the first position and a segmented instance of the second object superimposed in a position of the plurality of different positions from an image of the sequence of images;
- receiving a selection of a preview image of the sequence of preview images, the preview image comprising the first object fixed in the first position and the second object in a second position from a second image in the sequence of images; and
- generating a composite image comprising the first object in the first position and the second object in the second position as shown in the preview image.

20. The computer-implemented method as recited in claim 19 further comprising providing, for display via the graphical user interface, a scroll bar for navigating the sequence of preview images.

* * * * *